US012701297B2

(12) United States Patent
Leech et al.

(10) Patent No.: US 12,701,297 B2
(45) Date of Patent: Aug. 4, 2026

(54) CONTENT VIEWING TRACKING

(71) Applicant: Comcast Cable Communications, LLC, Philadelphia, PA (US)

(72) Inventors: Jonathan Alan Leech, Denver, CO (US); Mehul Patel, Downingtown, PA (US); Edward David Monnerat, Parker, CO (US); George Thomas Des Jardins, Washington, DC (US); Erik M. Schwartz, Kensington, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/933,726

(22) Filed: Oct. 31, 2024

(65) Prior Publication Data

US 2025/0126327 A1 Apr. 17, 2025

Related U.S. Application Data

(63) Continuation of application No. 18/077,660, filed on Dec. 8, 2022, now Pat. No. 12,167,091, which is a
(Continued)

(51) Int. Cl.
*H04N 21/466* (2011.01)
*H04N 21/431* (2011.01)
(Continued)

(52) U.S. Cl.
CPC ..... *H04N 21/4668* (2013.01); *H04N 21/4312* (2013.01); *H04N 21/4334* (2013.01);
(Continued)

(58) Field of Classification Search
None
See application file for complete search history.

(56) References Cited

U.S. PATENT DOCUMENTS 6,477,123 B1 11/2002 Hutter
6,782,551 B1 8/2004 Entwistle
(Continued)

FOREIGN PATENT DOCUMENTS

EP 1454484 B1 9/2004
EP 1901475 A2 3/2008
(Continued)

OTHER PUBLICATIONS

Customized Videos Playback: Standards for Content Description, Customization, and Personalization.*
(Continued)

*Primary Examiner* — Kim T Nguyen
(74) *Attorney, Agent, or Firm* — Banner & Witcoff, Ltd.

(57) ABSTRACT

This application describes methods, systems, and apparatus for allowing a user to easily determine whether the user and/or other user(s) have viewed content. For example, a program guide may display one or more graphics associated with the content (e.g., a movie poster), and in response to determining whether the user has viewed the content, the program guide may include an indication of whether the user has viewed the content. The program guide may include indications associated with multiple users (e.g., different colors, icons, graphics, or text). The program guide may filter the content based on whether the user has viewed the content (e.g., only display content the user has not viewed). A computing device storing the content may manage recording of the content based on whether the user has viewed the content (e.g., delete the recording if the user has viewed the content). A viewing history of the user may be maintained.

23 Claims, 15 Drawing Sheets

Related U.S. Application Data continuation of application No. 14/858,531, filed on Sep. 18, 2015, now Pat. No. 11,553,251, which is a continuation-in-part of application No. 14/310,327, filed on Jun. 20, 2014, now Pat. No. 10,776,414.

(51) Int. Cl.
| | |
|---|---|
| *H04N 21/433* | (2011.01) |
| *H04N 21/4335* | (2011.01) |
| *H04N 21/442* | (2011.01) |
| *H04N 21/472* | (2011.01) |
| *H04N 21/658* | (2011.01) |
| *H04N 21/81* | (2011.01) |

(52) U.S. Cl.
CPC ... *H04N 21/4335* (2013.01); *H04N 21/44204* (2013.01); *H04N 21/44226* (2020.08); *H04N 21/4667* (2013.01); *H04N 21/472* (2013.01); *H04N 21/6582* (2013.01); *H04N 21/812* (2013.01)

(56) References Cited

U.S. PATENT DOCUMENTS

| | | | |
|---|---|---|---|
| 6,925,610 B2 | 8/2005 | Thurston et al. | |
| 7,509,663 B2 | 3/2009 | Maynard et al. | |
| 7,624,416 B1 | 11/2009 | Vandermolen et al. | |
| 7,680,959 B2 | 3/2010 | Svendsen | |
| 7,757,250 B1 | 7/2010 | Horvitz et al. | |
| 8,095,432 B1 | 1/2012 | Berman et al. | |
| 8,180,804 B1 | 5/2012 | Narayanan et al. | |
| 8,291,321 B2 | 10/2012 | Matsubayashi | |
| 8,302,127 B2 | 10/2012 | Klarfeld et al. | |
| 8,397,257 B1 | 3/2013 | Barber | |
| 8,554,640 B1 | 10/2013 | Dykstra et al. | |
| 8,555,177 B1 | 10/2013 | Junee et al. | |
| 8,677,415 B2 | 3/2014 | Angiolillo et al. | |
| 8,692,763 B1 | 4/2014 | Kim | |
| 8,782,121 B1 | 7/2014 | Chang | |
| 8,782,122 B1 | 7/2014 | Chang | |
| 8,793,735 B2 | 7/2014 | VanDuyn et al. | |
| 8,811,685 B1 | 8/2014 | Bowers et al. | |
| 8,856,833 B2 | 10/2014 | Conness et al. | |
| 8,898,721 B2 * | 11/2014 | Hassell | H04N 21/4825 725/141 |
| 8,943,529 B2 | 1/2015 | Kardatzke | |
| 9,147,000 B2 | 9/2015 | Vasudevan et al. | |
| 9,183,523 B2 | 11/2015 | Cudak et al. | |
| 9,246,613 B2 | 1/2016 | McKee et al. | |
| 9,247,300 B2 | 1/2016 | Oddo et al. | |
| 9,277,472 B1 | 3/2016 | Price et al. | |
| 9,342,576 B2 | 5/2016 | Saito et al. | |
| 9,407,751 B2 | 8/2016 | Hansen et al. | |
| 9,426,509 B2 | 8/2016 | Ellis et al. | |
| 9,554,163 B2 | 1/2017 | Ellis et al. | |
| 9,626,875 B2 | 4/2017 | Gal et al. | |
| 9,826,034 B2 | 11/2017 | Chang | |
| 9,832,501 B2 * | 11/2017 | Ruffini | H04N 21/25891 |
| 10,034,051 B2 | 7/2018 | Card, II | |
| 10,362,351 B2 * | 7/2019 | Glennon | H04N 21/482 |
| 11,308,157 B1 | 4/2022 | Rackley, III et al. | |
| 11,449,901 B1 | 9/2022 | Rackley, III et al. | |
| 11,455,086 B2 * | 9/2022 | Fong | H04L 65/612 |
| 11,553,251 B2 * | 1/2023 | Leech | H04N 21/4334 |
| 11,570,521 B2 | 1/2023 | Perez | |
| 11,589,111 B2 | 2/2023 | Brenner et al. | |
| 11,605,097 B2 | 3/2023 | Stephens et al. | |
| 11,688,377 B2 | 6/2023 | Packouz | |
| 11,758,212 B2 | 9/2023 | Gordon et al. | |
| 11,816,703 B1 | 11/2023 | Rackley, III et al. | |
| 11,861,561 B2 | 1/2024 | Foley et al. | |
| 11,863,513 B2 * | 1/2024 | Boyd | H04L 51/214 |
| 11,886,690 B2 * | 1/2024 | Fong | G06F 3/04817 |
| 11,887,056 B2 | 1/2024 | Foley et al. | |
| 12,164,827 B2 * | 12/2024 | Reimann | H04N 21/43615 |
| 12,174,886 B1 * | 12/2024 | Moloney-Egnatios | H04L 65/00 |
| 12,212,817 B2 * | 1/2025 | Smith | H04N 21/235 |
| 12,335,544 B2 * | 6/2025 | Obcena | H04N 21/8456 |
| 12,423,352 B2 * | 9/2025 | Walker | H04N 5/76 |
| 12,513,360 B2 * | 12/2025 | Bates | H04N 21/439 |
| 12,525,247 B2 * | 1/2026 | Mehta | G10L 19/008 |
| 2002/0004742 A1 | 1/2002 | Willcocks et al. | |
| 2002/0004748 A1 | 1/2002 | Koga et al. | |
| 2002/0085024 A1 | 7/2002 | White et al. | |
| 2002/0152224 A1 | 10/2002 | Roth et al. | |
| 2002/0152459 A1 | 10/2002 | Bates et al. | |
| 2002/0199188 A1 | 12/2002 | Sie et al. | |
| 2003/0084448 A1 | 5/2003 | Soundararajan | |
| 2003/0145338 A1 | 7/2003 | Harrington | |
| 2003/0233278 A1 | 12/2003 | Marshall | |
| 2004/0031046 A1 | 2/2004 | Weinblatt et al. | |
| 2004/0122736 A1 | 6/2004 | Strock et al. | |
| 2004/0203901 A1 | 10/2004 | Wilson et al. | |
| 2004/0230484 A1 | 11/2004 | Greenlee | |
| 2004/0244030 A1 | 12/2004 | Boyce et al. | |
| 2005/0049858 A1 | 3/2005 | Busayapongchai | |
| 2005/0114340 A1 | 5/2005 | Huslak et al. | |
| 2005/0192000 A1 | 9/2005 | Lloyd | |
| 2005/0285739 A1 | 12/2005 | Velhal et al. | |
| 2006/0031882 A1 | 2/2006 | Swix et al. | |
| 2006/0041478 A1 | 2/2006 | Zheng | |
| 2006/0047678 A1 | 3/2006 | Miyazaki et al. | |
| 2006/0048184 A1 | 3/2006 | Poslinski et al. | |
| 2006/0143236 A1 | 6/2006 | Wu | |
| 2006/0143653 A1 | 6/2006 | Suh | |
| 2006/0149617 A1 | 7/2006 | Yamashita et al. | |
| 2006/0156329 A1 | 7/2006 | Treese | |
| 2006/0176398 A1 | 8/2006 | Kang | |
| 2006/0225088 A1 | 10/2006 | Gutta | |
| 2006/0271953 A1 | 11/2006 | Jacoby et al. | |
| 2006/0277100 A1 | 12/2006 | Parham | |
| 2007/0061863 A1 | 3/2007 | Rajasekaran | |
| 2007/0154168 A1 | 7/2007 | Cordray et al. | |
| 2007/0192723 A1 | 8/2007 | Anzelde et al. | |
| 2007/0196795 A1 | 8/2007 | Groff | |
| 2007/0207780 A1 | 9/2007 | McLean | |
| 2007/0294131 A1 | 12/2007 | Roman et al. | |
| 2008/0055272 A1 | 3/2008 | Anzures et al. | |
| 2008/0083001 A1 | 4/2008 | Peacock et al. | |
| 2008/0134053 A1 | 6/2008 | Fischer | |
| 2008/0177617 A1 | 7/2008 | Gupta | |
| 2008/0209229 A1 | 8/2008 | Ramakrishnan et al. | |
| 2008/0243733 A1 | 10/2008 | Black | |
| 2008/0276273 A1 | 11/2008 | Billmaier et al. | |
| 2008/0320139 A1 | 12/2008 | Fukuda et al. | |
| 2009/0019375 A1 | 1/2009 | Garofalo | |
| 2009/0021474 A1 | 1/2009 | Bentley | |
| 2009/0083116 A1 | 3/2009 | Svendsen | |
| 2009/0083779 A1 | 3/2009 | Shteyn et al. | |
| 2009/0089352 A1 | 4/2009 | Davis et al. | |
| 2009/0100463 A1 | 4/2009 | St. John-Larkin | |
| 2009/0119294 A1 | 5/2009 | Purdy et al. | |
| 2009/0132935 A1 | 5/2009 | Van Zwol | |
| 2009/0144635 A1 | 6/2009 | Miyazaki et al. | |
| 2009/0148124 A1 | 6/2009 | Athsani et al. | |
| 2009/0158326 A1 | 6/2009 | Hunt et al. | |
| 2009/0172161 A1 | 7/2009 | Singh | |
| 2009/0216577 A1 | 8/2009 | Killebrew | |
| 2009/0234876 A1 | 9/2009 | Schigel et al. | |
| 2009/0281888 A1 | 11/2009 | Zai et al. | |
| 2009/0300670 A1 | 12/2009 | Barish | |
| 2010/0023506 A1 | 1/2010 | Sahni et al. | |
| 2010/0031162 A1 | 2/2010 | Wiser et al. | |
| 2010/0058376 A1 | 3/2010 | Alhadeff et al. | |
| 2010/0083115 A1 | 4/2010 | Park | |
| 2010/0122207 A1 | 5/2010 | Kim et al. | |
| 2010/0138867 A1 | 6/2010 | Wong et al. | |
| 2010/0162289 A1 | 6/2010 | Sanders | |
| 2010/0229212 A1 | 9/2010 | Liu et al. | |
| 2010/0241699 A1 | 9/2010 | Muthukumarasamy et al. | |
| 2010/0250336 A1 | 9/2010 | Selinger et al. | |
| 2010/0250341 A1 | 9/2010 | Hauser | |

(56)             References Cited

U.S. PATENT DOCUMENTS

| | | |
|---|---|---|
| 2010/0251305 A1 | 9/2010 | Kimble et al. |
| 2010/0287033 A1 | 11/2010 | Mathur |
| 2010/0293034 A1 | 11/2010 | Olejniczak et al. |
| 2010/0306401 A1 | 12/2010 | Gilson |
| 2010/0318611 A1 | 12/2010 | Curtin et al. |
| 2010/0325544 A1 | 12/2010 | Alhadeff et al. |
| 2010/0325646 A1 | 12/2010 | Alhadeff et al. |
| 2010/0332330 A1 | 12/2010 | Goel et al. |
| 2011/0035445 A1 | 2/2011 | Eickhoff |
| 2011/0124408 A1 | 5/2011 | Ward |
| 2011/0154213 A1 | 6/2011 | Wheatley et al. |
| 2011/0161148 A1 | 6/2011 | Schmidt |
| 2011/0184792 A1 | 7/2011 | Butcher et al. |
| 2011/0231265 A1 | 9/2011 | Brown et al. |
| 2011/0246908 A1 | 10/2011 | Akram |
| 2011/0264494 A1 | 10/2011 | Lechowicz |
| 2011/0276882 A1 | 11/2011 | Buehler et al. |
| 2011/0312375 A1 | 12/2011 | Kim et al. |
| 2012/0047008 A1 | 2/2012 | Alhadeff et al. |
| 2012/0064820 A1 | 3/2012 | Bemmel |
| 2012/0089705 A1 | 4/2012 | French et al. |
| 2012/0120094 A1 | 5/2012 | Oiwa et al. |
| 2012/0243850 A1 | 9/2012 | Basra et al. |
| 2013/0046772 A1 | 2/2013 | Gu et al. |
| 2013/0057765 A1 | 3/2013 | Zeleznikar |
| 2013/0103628 A1 | 4/2013 | Skelton et al. |
| 2013/0125161 A1 | 5/2013 | Herby et al. |
| 2013/0247112 A1* | 9/2013 | Hassell .................. G11B 27/11 |
| | | 725/59 |
| 2013/0268966 A1 | 10/2013 | Foote |
| 2013/0297447 A1 | 11/2013 | Sakata |
| 2013/0322850 A1 | 12/2013 | Chang et al. |
| 2013/0325655 A1 | 12/2013 | Wouhaybi et al. |
| 2014/0005814 A1 | 1/2014 | Hwang et al. |
| 2014/0019902 A1 | 1/2014 | DeLuca et al. |
| 2014/0033240 A1 | 1/2014 | Card, II |
| 2014/0046660 A1 | 2/2014 | Kamdar |
| 2014/0075352 A1 | 3/2014 | Hansen et al. |
| 2014/0075385 A1 | 3/2014 | Wan et al. |
| 2014/0089980 A1 | 3/2014 | Alexander et al. |
| 2014/0123160 A1 | 5/2014 | van Coppenolle et al. |
| 2014/0130076 A1 | 5/2014 | Moore et al. |
| 2014/0132524 A1 | 5/2014 | Lee |
| 2014/0149424 A1 | 5/2014 | Kalmes et al. |
| 2014/0173435 A1 | 6/2014 | Arnold |
| 2014/0196071 A1* | 7/2014 | Terpstra ............... H04N 21/812 |
| | | 725/19 |
| 2014/0201766 A1 | 7/2014 | Stepanov et al. |
| 2014/0208362 A1 | 7/2014 | Alexander et al. |
| 2014/0215506 A1 | 7/2014 | Kalmes et al. |
| 2014/0331260 A1 | 11/2014 | Gratton |
| 2014/0344861 A1 | 11/2014 | Berner et al. |
| 2015/0003595 A1 | 1/2015 | Yaghi et al. |
| 2015/0012416 A1 | 1/2015 | Woods |
| 2015/0066652 A1 | 3/2015 | Collins et al. |
| 2015/0089517 A1 | 3/2015 | Ruffini et al. |
| 2015/0121408 A1 | 4/2015 | Jacoby et al. |
| 2015/0133164 A1 | 5/2015 | Song et al. |
| 2015/0143394 A1 | 5/2015 | Hijikata et al. |
| 2015/0148005 A1 | 5/2015 | Chau et al. |
| 2015/0169189 A1 | 6/2015 | Want et al. |
| 2015/0195621 A1 | 7/2015 | Harron et al. |
| 2015/0199708 A1 | 7/2015 | Ying et al. |
| 2015/0287219 A1 | 10/2015 | Liang et al. |
| 2015/0304718 A1 | 10/2015 | Cui et al. |
| 2015/0319468 A1 | 11/2015 | Park et al. |
| 2015/0350709 A1 | 12/2015 | Tomita |
| 2016/0014461 A1* | 1/2016 | Leech .................. H04N 21/812 |
| | | 725/14 |
| 2016/0019017 A1 | 1/2016 | Walker et al. |
| 2016/0063998 A1 | 3/2016 | Krishnamoorthy et al. |
| 2021/0250656 A1 | 8/2021 | Perez |
| 2022/0210498 A1* | 6/2022 | Walker ................ H04N 21/231 |
| 2022/0210518 A1* | 6/2022 | Smith .............. H04N 21/44213 |
| 2022/0295131 A1* | 9/2022 | Shah .................. H04N 21/8456 |
| 2023/0308700 A1 | 9/2023 | Perez |
| 2025/0126327 A1* | 4/2025 | Leech ................ H04N 21/4335 |
| 2025/0254398 A1* | 8/2025 | Hou .................... H04N 21/4668 |
| 2025/0301201 A1* | 9/2025 | Bates ................... H04N 21/262 |
| 2026/0025538 A1* | 1/2026 | Parks, Jr. ......... H04N 21/23439 |

FOREIGN PATENT DOCUMENTS

| | | |
|---|---|---|
| WO | 2007143562 A2 | 12/2007 |
| WO | 2009012048 A2 | 1/2009 |
| WO | 2011002572 A1 | 1/2011 |

OTHER PUBLICATIONS

Customized Video Playback: Standards for Content Description, Customization, and Personalization (Year: 2004).*

User Interface Design for Keyframe-Based Content Browsing of Digital Video (Year: 2001).*

European Office Action—EP Appl. 11166793.7—dated Oct. 8, 2015.

Canadian Office Action—CA Application No. 2740650—dated Feb. 28, 2017.

European Summons to Oral Proceedings—EP Appl. 11166793.7—dated Apr. 12, 2017.

Feb. 2, 2018—Canadian Office Action—CA 2,740,650.

EP 11166793.9-221 Search Report dated Aug. 5, 2011.

Entertainment Fiend: Keep Track of Watched TV Show Episodes and Movies and Plan What to Watch! dated Apr. 11, 2008, http:// entertainmentfiend.blogspot.com/2008/04/keep-track-of-watched-tv-show-episodes.html, retrieved Jul. 31, 2014, 4 pages.

Entertainment Fiend: Keep Track of Watched TV Show & Movies and Plan What to Watch—Updated for 2011 Edition, dated Oct. 13, 2011, http://entertainmentfiend.blogspot.com/2011/10/keeping-track-of-watched-tv-shows.html, retrieved Jul. 31, 2014, 2 pages.

Alan Henry. How to Track All Your TV Shows So You Never Miss an Episode, Lifehacker, http://lifehacker/how-to-track-all-your-tv-shows-so-you-never-miss-an-epi-1180239026, 2013, 11 pages.

Thorin Klosowski. Netflix Profiles Ensure Roommates Won't Mess Up Your Recommendations, Lifehacker, http://lifehacker.com/netflix-profiles-ensure-roommates-wont-mess-up-your-re-987927584, dated Aug. 1, 2013, 11 pages.

Feb. 21, 2019—Canadian Office Action—CA 2,740,650.

Mar. 12, 2020—Canadian Office Action—CA 2,740,650.

R. Gaglianello, L. Spergel and D. Liu, "Convergence of telephony and television: More than a computer on your TV," 2009 IEEE International Symposium on Broadband Multimedia Systems and Broadcasting, Bilbao, 2009, pp. 1-7, doi: 10.1109/ISBMSB.2009.5133763. (Year: 2009).

J. B. Carlucci, "Social Media Television in Today's Cable Systems," 2010 7th IEEE Consumer Communications and Networking Conference, Las Vegas, NV, 2010, pp. 1-5, doi: 10.1109/CCNC.2010.5421636. (Year: 2010).

D. C. A. Bulterman, P. Cesar, A. J. Jansen, H. Knoche and W. Seager, "Enabling Pro-Active User-Centered Recommender Systems: An Initial Evaluation," Ninth IEEE International Symposium on Multimedia Workshops (ISMW 2007), Beijing, 2007, pp. 195-200, doi: 10.1109/ISM.Workshops.2007.41. (Year: 2007).

P. Cesar, D. C. A. Bulterman and A. J. Jansen, "Social Sharing of Television Content: An Architecture," Ninth IEEE International Symposium on Multimedia Workshops (ISMW 2007), Beijing, 2007, pp. 145-150, doi: 10.1109/ISM.Workshops.2007.34. (Year: 2007).

E. Larson and S. Taulu, "Reducing Sensor Noise in MEG and EEG Recordings Using Oversampled Temporal Projection," in IEEE Transactions on Biomedical Engineering, vol. 65, No. 5, pp. 1002-1013, May 2018, doi: 10.1109/TBME.2017.2734641. (Year: 2018).

M. Schroder et al., "Building Autonomous Sensitive Artificial Listeners," in IEEE Transactions on Affective Computing, vol. 3, No. 2, pp. 165-183, Apr.-Jun. 2012, doi: 10.1109/T-AFFC.2011.34. (Year: 2011).

Aug. 17, 2022—CA Office Action—CA App. No. 3122547.

N. Howard, "Approach Towards a Natural Language Analysis for Diagnosing Mood Disorders and Comorbid Conditions," 2013 12th

(56)                    References Cited

OTHER PUBLICATIONS

Mexican International Conference on Artificial Intelligence, Mexico, Mexico, 2013, pp. 234-243, doi: 10.1109/MICAI.2013.50. (Year: 2013).

Liu, Ning-Han, Szu-Wei Lai, Chien-Yi Chen, and Shu-Ju Hsieh. "Adaptive music recommendation based on user behavior in time slot." International Journal of Computer Science and Network Security 9, No. 2 (2009): 219-227. (Year: 2009).

Wiggins, Grant. "7 Keys to Effective Feedback", Educational Leadership / Sep. 2012, ASCD / www.ascd.org.

Xia, Weiwei, A new collaborative filtering approach utilizing item's popularity, Dec. 1, 2008, 2008 IEEE International Conference on Industrial Engineering and Engineering Management, pp. 1480-1484 (Year: 2008).

U.S. Pat. No. 10,362,978, Computational Model for Mood, Jul. 30, 2019.

U.S. Pat. No. 10,776,414, Dynamic Content Recommendations, Sep. 15, 2020.

U.S. Pat. No. 10,805,102, Content Recommendation System, Oct. 13, 2020.

U.S. Pat. No. 10,849,542, Computational Model for Mood, Dec. 1, 2020.

U.S. Pat. No. 11,455,086, System and Method for Content Selection, Sep. 27, 2022.

U.S. Pat. No. 11,497,424, Determination of Content Services, Nov. 15, 2022.

U.S. Pat. No. 11,553,521, Content Viewing Tracking, Jan. 10, 2023.

U.S. Pat. No. 11,580,568, Content Recommendation System, Feb. 14, 2023.

U.S. Pat. No. 11,593,423, Dynamic Content Recommendations, Feb. 28, 2023.

U.S. Pat. No. 11,886,690, System and Method for Content Selection, Jan. 30, 2024.

U.S. Pat. No. 11,944,437, Determination of Content Services, Apr. 2, 2024.

U.S. Pat. No. 12,167,091, Content Viewing Tracking, Dec. 10, 2024.

U.S. Appl. No. 18/093,644, Content Recommendation System, filed Jan. 5, 2023.

U.S. Appl. No. 18/155,542, Dynamic Content Recommendations, filed Jan. 17, 2023.

Nov. 6, 2025—Canadian Office Action—CA App. 3122547.

* cited by examiner

500

Create Content Recommendation Periods and Determine Content Recommendation Period Times — 502

Determine Content Types/Classifications for Content Recommendation Period — 504

Determine User Behavior — 506

Analyze Content to Determine Metadata and Contextual Features Relating to User Behavior — 508

Determine Profile — 510

End — 512

Determine whether a user has viewed content — 902

Determine that a graphic associated with the content is being displayed by a program guide — 904

Generate for display an indication of whether the user has viewed the content — 906

Determine whether a user has viewed content — 1102

Determine that a graphic associated with the content is being displayed by a guide — 1104

Generate an indication of whether the user has viewed the content — 1106

Determine whether a second user has viewed the content — 1108

Generate an indication of whether the second user has viewed the content — 1110

CONTENT VIEWING TRACKING

CROSS REFERENCE TO RELATED APPLICATIONS

This application is a continuation of and claims priority to U.S. patent application Ser. No. 18/077,660, filed Dec. 8, 2022, which is a continuation of U.S. patent application Ser. No. 14/858,531, filed Sep. 18, 2015 (now U.S. Pat. No. 11,553,251), which is a continuation-in-part of U.S. patent application Ser. No. 14/310,327, filed Jun. 20, 2014 (now U.S. Pat. No. 10,776,414), each of which is hereby incorporated by reference in its entirety.

BACKGROUND

Content providers have long sought to determine how to quickly produce accurate content recommendations for users. There is an ever-present need to accurately produce content recommendations that fit into a user's daily schedule, while maximizing the amount of time the user has available to access those content recommendations.

SUMMARY

The following summary is for illustrative purposes only, and is not intended to limit or constrain the detailed description.

One or more aspects of the disclosure provide for a method that may include determining whether a user has viewed content. The method may include determining that a graphic associated with the content is being displayed by a program guide. The method may include generating for display an indication of whether the user has viewed the content, the indication being displayed with the program guide.

In some embodiments, the method may include determining whether a different user has viewed the content, and generating for display a different indication of whether the different user has viewed the content, the different indication being displayed with the program guide. The indication may include a color, graphic, photograph, shape, icon, text, or other representation uniquely associated with the user. The indication may include a status bar corresponding to a percentage of the content that the user has viewed, a date that the user viewed the content, or other information about the user's interaction with the content.

In some embodiments, a method may include determining whether a user is or may be interested in content, recording content based on determining that the user is or may be interested in the content, and displaying an indication with the program guide if the user is or may be interested in the content.

One or more aspects of the disclosure also provide for a method that may include determining an identity of a current user, generating for display an indication of whether a different user has viewed content, and filtering, for a program guide, a graphic representative of content based on whether the current user has viewed the content.

One or more aspects of the disclosure also provide for a method that may include updating a viewing history of a user, determining that a graphic associated with content is being displayed by a program guide, determining whether the viewing history of the user includes the content, and generating for display an indication of whether the viewing history of the user includes the content.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
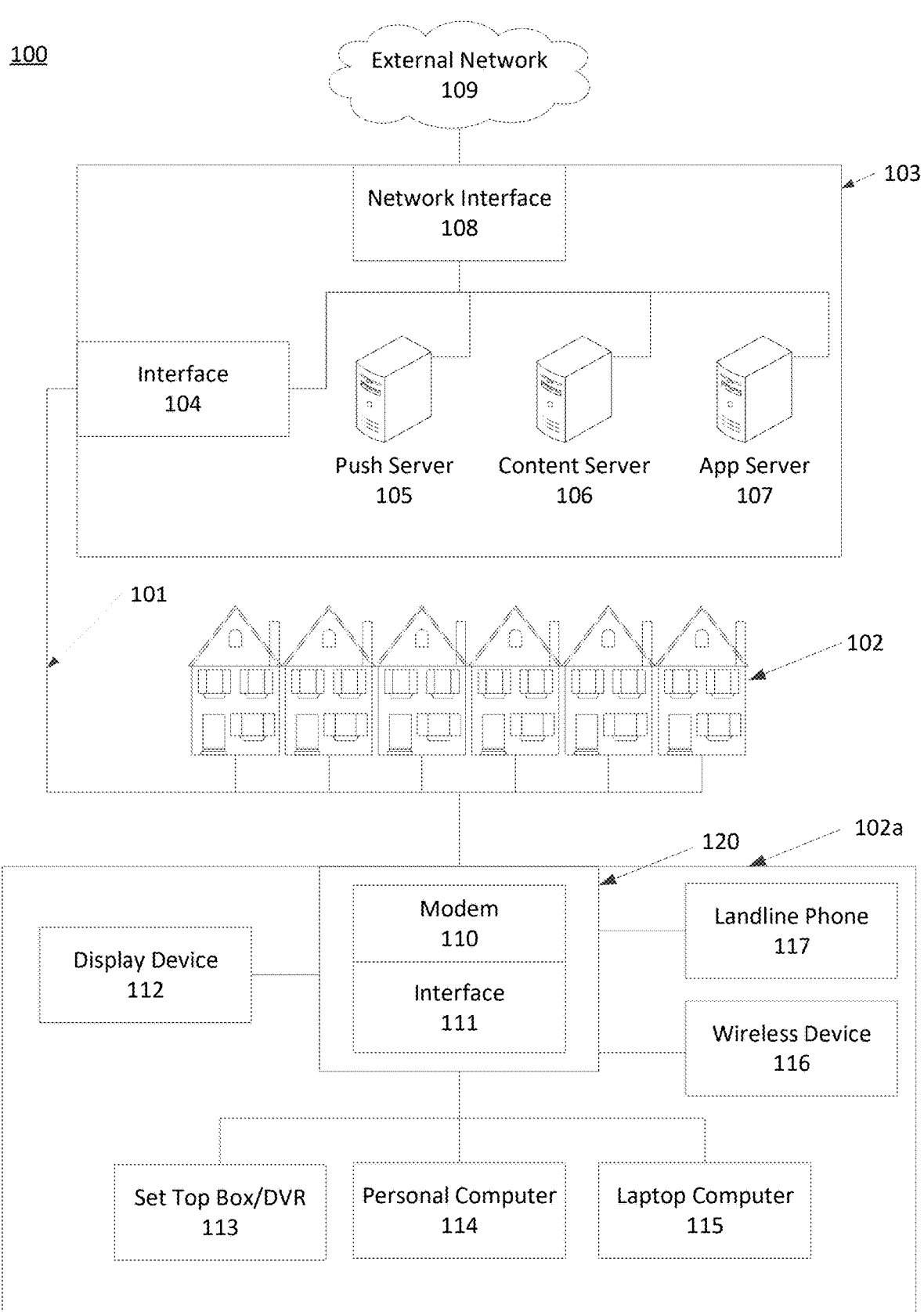
FIG. 1 illustrates an example communication network on which various features described herein may be used.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103.

The local office 103 may transmit downstream information signals onto the links 101, and each premises 102 may have a receiver used to receive and process those signals.

There may be one or more links 101 originating from the local office 103, and it may be split a number of times to distribute the signal to the various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single the local office 103 to reach even farther with its network of the links 101 than before.

The local office 103 may include an interface 104, such as a termination system (TS). More specifically, the interface 104 may be a cable modem termination system (CMTS), which may be a computing device configured to manage communications between devices on the network of the links 101 and backend devices such as the servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include one or more push notification servers 105. The push notification server 105 may generate push notifications to deliver data and/or commands to the various premises 102 in the network (or more specifically, to the devices in the premises 102 that are configured to detect such notifications).

The local office 103 may also include one or more content servers 106. The content server 106 may be one or more computing devices that are configured to provide content to users at their premises. This content may be, for example, advertisements (such as commercials), video on demand movies, television programs, songs, text listings, etc. The content server 106 may include software to validate user identities and entitlements, to locate and retrieve requested content, to encrypt the content, and to initiate delivery (e.g., streaming or downloading) of the content to the requesting user(s) and/or device(s). The content server 106 may also be configured to generate advertising decisions and rules, and transmit them to a requesting user or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. As another example, the application server or another server may be responsible for monitoring user viewing habits and collecting that information for use in selecting advertisements. As another example, the application server or another server may be responsible for formatting and inserting advertisements in, for example a video stream being transmitted to the premises 102. Yet the application server or another application server may be responsible for associating interactive components into and with content and/or advertisements. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premises 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111, such as a gateway, may be a computing device that communicates with the modem(s) 110 to allow one or more other devices in the premises 102a, to communicate with the local office

103 and other devices beyond the local office 103. The gateway interface device 111 may be a set-top box, digital video recorder (DVR), computer server, or any other desired computing device. The gateway interface device 111 may also include (not shown) local network interfaces to provide communication signals to requesting entities/devices in the premises 102a, such as the display devices 112 (e.g., televisions), the additional set-top boxes 113 or DVRs, the personal computers 114, the laptop computers 115, the wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), the landline phones 117 (e.g., Voice over Internet Protocol-VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

Figure 2:
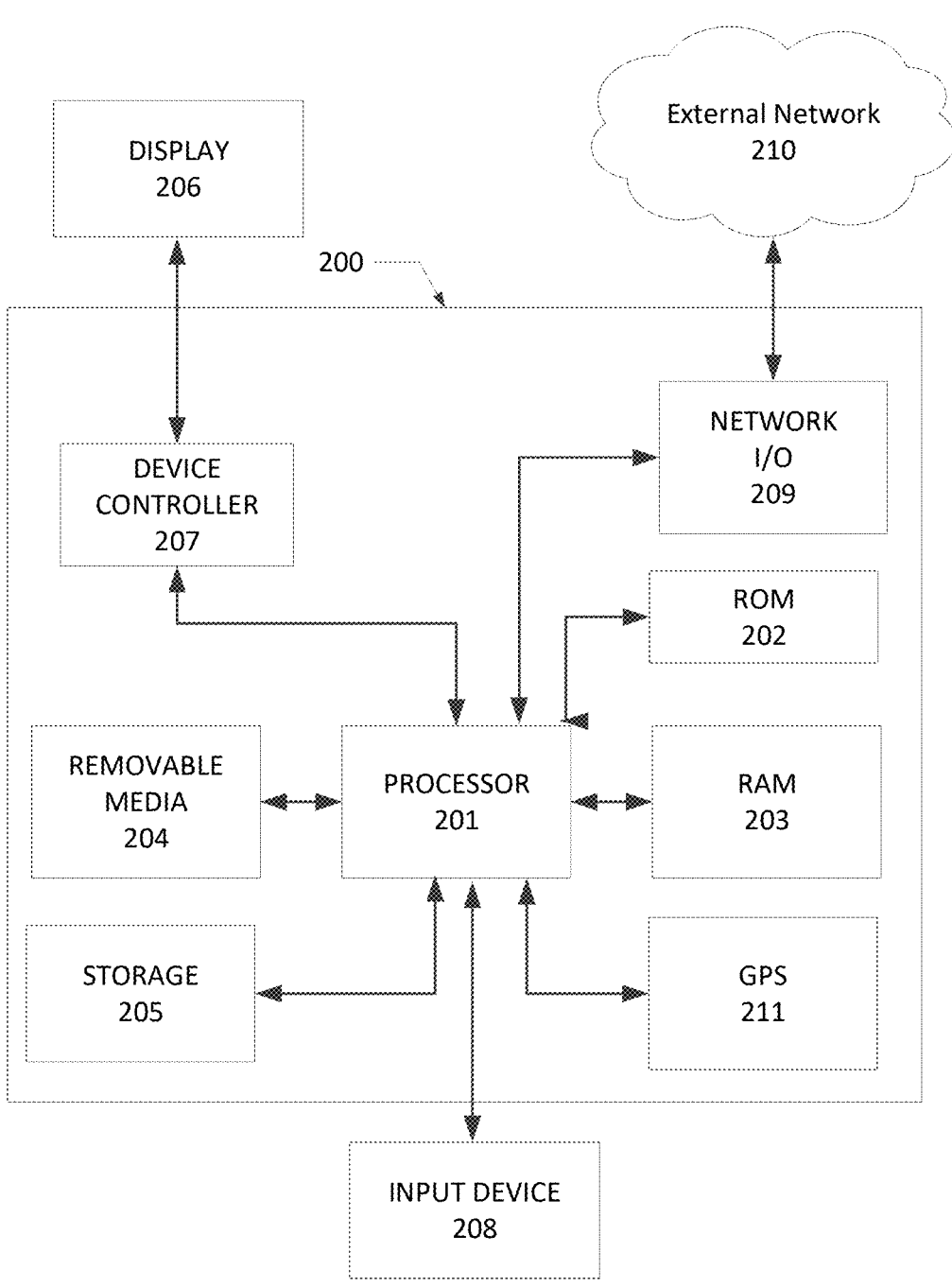
FIG. 2 illustrates an example computing device that may be used to implement any of the methods, servers, entities, and computing devices described herein.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) storage 205, such as a hard drive. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which may be configured to receive and process global positioning signals and determine, with possible assistance from an external server and antenna, a geographic position of the device.

FIG. 2 shows an example hardware configuration. Modifications may be made to add, remove, combine, divide, etc., components as desired, and some or all of the elements may be implemented using software. Additionally, the components illustrated may be implemented using basic display devices and components, and the same components (e.g., the processor 201, the ROM 202, the display 206, other input/output devices, etc.) may be used to implement any of the other display devices and components described herein. For example, the various components herein may be implemented using display devices having components such as a processor executing computer-executable instructions stored on a computer-readable medium (e.g., the storage 205), as illustrated in FIG. 2.

Having described examples of network environments and content viewing devices that may be used in implementing various aspects of the disclosure, several examples will now be described in greater detail illustrating how a display device may monitor user actions during an advertisement, a display device may restrict a user's control of the display device during an advertisement, and efficacy file reports are created and used. The viewing device, which may be a user's tablet computer, personal computer, smartphone, DVR, or any other computing device as described herein, may monitor any client-side interaction with the user during an advertisement, such as detecting a change in audio level or order of display elements. In other examples, the display device may prohibit a user from muting an advertisement during play.

Figure 3:
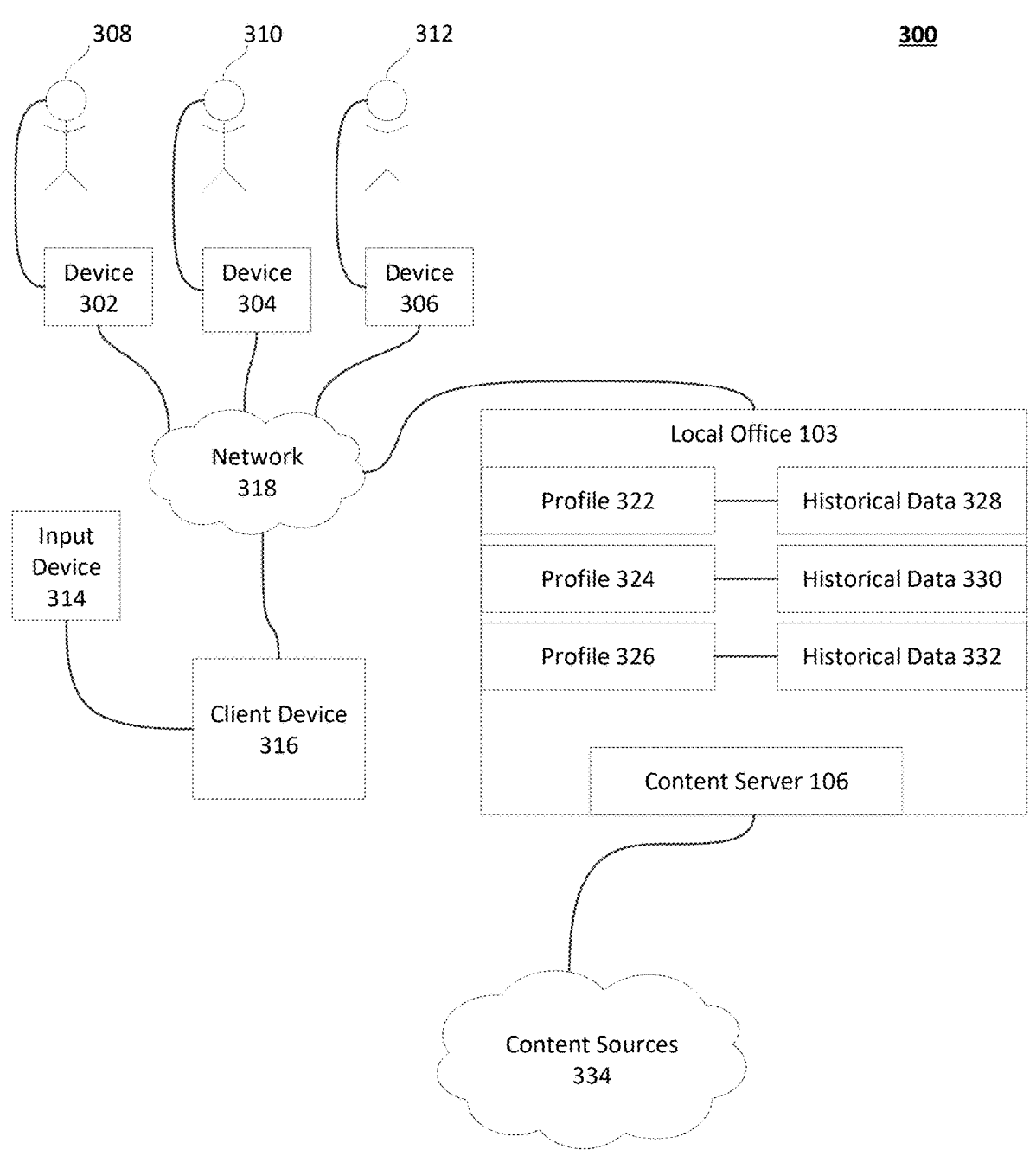
FIG. 3 illustrates an example system in accordance with aspects of the present disclosure.

FIG. 3 illustrates an example system 300 in accordance with one or more disclosed features described herein. The system 300 may include the client device 316. The client device 316 may comprise, be substantially similar to, and/or be the same as computing device 200, as shown in FIG. 2. The client device 316 may comprise, for example, a set-top box 113, personal computer 114, laptop computer 115, gateway 111, modem 110, display device 112, landline phone 117, wireless device 116, a mobile device (smartphone, tablet, smartwatch, BLUETOOTH, etc.), digital video recorder (DVR), digital video player, audio device, or any other device capable of providing or accessing media and/or content, or combinations thereof. The client device 316 may be operably connected to an input device 314, which may comprise a remote control, keyboard, mouse, touch screen, microphone, or the like used to control and access features of the client device 316. The input device 314 m may comprise, be substantially similar to, and/or be the same as input device 208, as shown in FIG. 2. One or more users, such as the user 308, the user 310, and the user 312, may interact with the input device 314 and/or the client device 316. The users 308, 310, and 312 may also interact and/or be associated with one or more computing devices, such as the computing devices 302, 304, and 306. The computing devices 302, 304, and 306 may comprise, be substantially similar to, and/or be the same as computing device 200, as shown in FIG. 2. The computing devices 302, 304, and 306 may comprise, for example, a set-top box 113, personal computer 114, laptop computer 115, gateway 111, modem 110, display device 112, landline phone 117, wireless device 116, a mobile device (smartphone, tablet, smartwatch, BLUETOOTH, etc.), digital video recorder (DVR), digital video player, audio device, or any other device capable of providing or accessing media and/or content, or combinations thereof.

The client device 316 may be operably connected to the local office 103 via a network 318. The network 318 may comprise, be substantially similar to, and/or be the same as network 100, link 101, external network 109, and/or external network 210 as shown in FIGS. 1 and 2. The network 318 may be, for example, a wireless network, a MoCA in-home coaxial cable network, a cellular network, an Ethernet network, a Wi-Fi network, and the like. The local office 103, which may be associated with a head end, may provide content to the client device 316 via the network 318. The local office 103 may include and/or be associated with one or more profiles, such as the user profile 322, the user profile 324, and the user profile 326. Each user profile may be associated with the users 308, 310, or 312. Each user profile may be associated with a user's historical data, such as the historical data 328, the historical data 330, and the historical data 332 (each of which may correspond to the users 308, 310, and 312). It is noted that while the local office 103 is shown in FIG. 3 to include profiles 322, 324, and 326 along with the historical data 328, 330, and 332, profiles 322, 324, and 326 and the historical data 328, 330, and 332 may be included in and/or associated with other components, such as the client device 316. As previously shown in FIG. 1, the local office 103 may include one or more content servers 106. The local office 103 (e.g., via the content server 106) may also access and retrieve content from one or more content sources 334, such as internet content sources, music content sources, or video content sources, for transmission to one or more devices, such as the client device 316.

Each component of the system 300 may be operably connected to and/or interact with each other via a direct and/or indirect connection, such as via a network or hard-wire. Each component of the system 300 may be affiliated, operably connected to, and/or located at a service or content provider, such as the local office 103.

FIG. 3 illustrates one client device 316, however, any number of client devices, such as two, ten, or a hundred, may be included in the system 300 and/or in any of the embodiments disclosed herein. The client device 316 may be located at a location, such as premises 102a. Additionally, client devices may be located at a same or similar location, such as premises 102a, or may be located at different locations. The client device 316 may provide and/or access content services, such as video/image content services, audio content services, internet content services, and the like. The client device 316 may access content services and other services via, for example, a video processor or audio processor (e.g., similar to device controller 207) and may display content on a display (e.g., similar to display 206 as shown in FIG. 2). For example, the client device 316 may launch an application on the client device 316, and access content via the launched application. The client device 316 may access content on any number of content platforms, which may include a linear content platform, media (video/audio) on-demand content platform, mobile content platform, a service provider-specific content platform, an online content platform, or other content platform that may be capable of providing content on the client device 316, or combinations thereof. For example, the client device 316 may be a mobile device, and may provide content, such as a movie, through a mobile application. In such a scenario, the content may be provided through a mobile content platform. In another example, the client device 316 may be a set-top box, and may provide content, such as a television program or show, via linear content (e.g., live broadcast). In such a scenario, the content may be provided through a linear content platform. In yet another example, the client device 316 may be a set-top box, and may provide content, such as a song, using a media on-demand content platform, and/or may provide content, such as an internet video, using an online content platform. A service provider may provide content that may be specific for that service provider with the service provider's own content platform. For example, content provided on a service provider content platform may be customized by a service provider for a particular client device and/or user, such as providing a user's favorite part of a movie, recommended scene of a movie, and the like. Additionally, content provided on a service provider content platform may be a combination of various other platforms, such as combining online content with linear or video on-demand content.

Users 308, 310, and 312 may access content from the client device 316. For example, the user 308 may request access to a movie on a set-top box, and subsequently watch the movie on a display connected to the set-top box. In this example, the user 308 may use an input device 314 (such as a remote control) to request access to the movie on the set-top box. According to some aspects, the local office 103 may then determine and/or access the historical data 328, 330, and 332 corresponding to each of the users 308, 310, and 312. The historical data 328 may include the viewing patterns and/or behavior of the user 308, as well as features of any viewed/accessed content, such as the content's metadata and/or contextual features (e.g., state of the content and the actual information embedded in the content). In addition, the historical data 328 may also include the relationship between metadata or contextual information from a show and how they affect the viewing patterns or behavior of the user 308.

The historical data 328 (e.g., metadata and/or contextual features of content and/or behavior of a user) may include the time or date associated with an accessed content item (such as if a show comes on at 21:00), a particular day of the week associated with a content item (such as if a new episode of a show only comes on Tuesdays), whether there are any exciting moments or events in the content (such as the number of highlight plays in a football game), or other descriptive information for content (such as a score of a football game at any point during the football game). Other information that may be included in the historical data 328 may include the name or description of the content item, the content item's platform or channel, content item's location (e.g., IP address), a category/type/classification for the content (such as kids, movie, sports, drama, sitcom, comedy, news, and the like), whether the content is broadcasted live, and the like. The historical data 328 may also include a DVR list of content for a user, which shows the user typically records, which shows the user typically watches live. The historical data 328 may also include which applications the user accesses (such as a news, traffic, weather, shopping, gaming, fantasy sports, or music application) and what time the user accesses those applications.

Contextual information may include any descriptive information regarding what is actually happening in a show or application. For example, if a user is watching a football game, contextual information may include that the user's favorite team is losing 49-7 and the game is in the second quarter. In such a situation, if the user then opts to change to another program, then the user's behavior may be determined to include changing the channel when the user's favorite team is losing 49-7 in the second quarter. The user's favorite team may be determined by any number of factors, such as a correlation between the location associated with a team and of the user, how many games the user has watched of a particular team, and whether the user has input the user's favorite team into the client device 316 and/or the local office 103. It is noted that while the user 308 and the user 308's historical data 328 are used in the above examples, other users, such as the users 310 and 312, and their historical data, such as the historical data 330 and 332, may also be used in the examples and embodiments disclosed herein. In addition, the historical data 328 (e.g., information regarding the user 308's behavior) may also include whether the user 308 watched a show for the entire scheduled length of the show (or accessed a song for the entire length of the song), which portion of a show the user watched (e.g., beginning, middle, end), how much of a show a user watched (e.g., 20% or 50%), whether and at which point during the show the user stopped accessing the show and/or changed to another show. A user's historical data will be described below in more detail.

Using the historical data 328, 330, and 332, the local office 103 may then create and/or store one or more user profiles 322, 324, and 326 which may correspond to each of the users 308, 310, and 312. A user profile 322 may include a schedule describing when and/or at what times during a period of time (e.g., an hour, day, week, month, year, etc.) the user 308 accesses/watches content. For example, the user profile 322 may include a schedule detailing which parts of the day the user 308 tends to access or frequently accesses content (such as time periods during the day), and which types of content the user 308 tends to watch or frequently watches during those parts of the day (such as watching kids programing from 16:00 to 17:00). Tending to access content may describe a situation in which the user 308 accesses a content a larger part of the time (such as 20%, 50%, 70%, and 90% of the time and the like).

The user profile 322 may include different schedules for different time periods, such as a different schedule for each day of the week. For example, if the user 308 tends to watch professional football on Mondays from 19:00-22:00, Thursdays at 20:00-23:00, and Sundays at 19:00-22:00, then a schedule for Monday, Thursday, and Sunday may include professional football on Mondays from 19:00-22:00, Thursdays at 20:00-23:00, and Sundays at 19:00-22:00. Consequently, a schedule for Tuesday, Wednesday, Friday, and Saturday may not include professional football, and may contain other content types beginning at 20:00 or 21:00 on those days. Additionally, some content items may only be accessible during particular times of the year, such as professional American football being available August through February. Thus, a profile may be updated to reflect any seasonal variation in content programing. Also, the local office 103 may create and maintain a profile for one or more devices associated with a user. For example, the local office 103 may create a profile for the user 308 for a set-top box, a separate profile for the user 308 for a smartphone, and a separate profile for the user 308 for a tablet. It is noted that while the user 308 and the user 308's profile 322 are used in the above examples, other users, such as users 310 and 312 and their corresponding profiles (e.g., profiles 324 and 326) may also be used in the examples and embodiments disclosed herein. A user's profile will described below in more detail.

Figure 4:
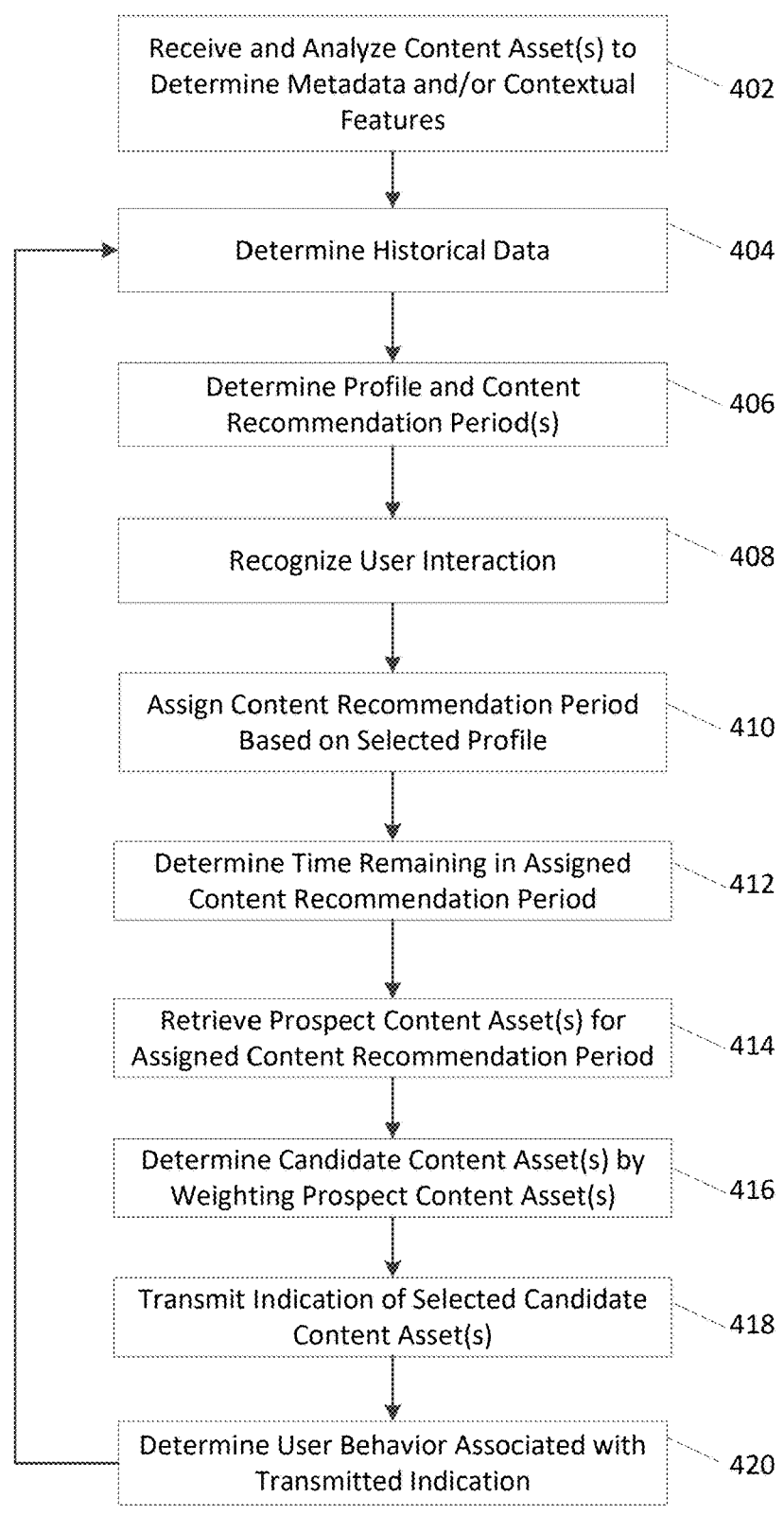
FIG. 4 illustrates an example flow diagram of a method in accordance with aspects of the present disclosure.

FIG. 4 is an exemplary flow diagram illustrating an example process 400 in accordance with one or more disclosed features described herein. In one or more embodiments, the process illustrated in FIG. 4 and/or one or more steps thereof may be performed by one or more computing devices (e.g., the input device 314, the client device 316, computing devices, 302, 304, and 306, the local office 103, one or more content providers, and the like). In other embodiments, the process illustrated in FIG. 4 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

In the example provided, the process 400 may begin with step 402, in which the local office 103 may receive and analyze one or more content assets to determine various types of metadata for those content assets. The metadata may include contextual features of the content, such as information that describes what is happening or what happened during a show, or what is happening or happen in an accessed application. For example, contextual features for a football game may include the number of highlight plays that happened during the game (such as if the ball advanced 20 yards, then it is a highlight play), the score at any particular point during the game, which teams are playing, which team is winning, whether there is a blowout score (which may be based on a threshold, such as over 21 points), whether it is raining or snowing, whether an unusual event happened during the game (such as an injury or fan running onto the field), whether the game lasted longer than an expected length of time, whether the game went into overtime, what time is left, which quarter the game is in, and the like. In another example, the user 308 may access a gaming application on the client device 316 and may play a video game with the gaming application. Thus, contextual features for the video game and/or gaming application may include whether the user did well or poorly in the video game (e.g., won or lost the game), the score in the video game, the game level of the video game, how many points a user obtained during a video session, and the like. It is noted that the analyzed content assets may include assets configured for any content platform, such as internet, linear, DVR, on-demand, music, and applications (e.g., traffic, weather, social media). Additional metadata may include whether an episode of a show is a new or repeated episode and a content classification (such as kids, sports, movie, drama, adult, news, etc.). The metadata may also include the time and day the content asset may be broadcasted live by the local office 103.

The contextual information may include whether a show deviated from how the show is expected to happen. For example, a children's television show, such as SpongeBob Square Pants, may not have a lot of contextual variance from episode to episode (e.g., follows the same general story with little to no deviation between episodes). Thus, contextual features may generally be the same from episode to episode. But as in the above football example, one football game may be completely different than another football. For example, the teams may be different, the score may be different, the number and types (e.g., highlights, running plays, passing plays, etc.) of plays may be different, the games' weather may be different, and the like. Thus, there may be more contextual variance between the contextual features of different sporting events. Similarly, a drama, such as Downton Abbey, may generally follow a similar storyline with each episode, but, there may some variation between different episodes of Downton Abby (e.g., someone was killed in an episode, someone was married in an episode, a party happened in an episode, etc.).

At step 404, the local office 103 may determine, gather, and/or analyze historical data (e.g., the historical data 328) for a user (e.g., the user 308). The historical data 328 may include the content viewing patterns and/or behavior of the user 308 regarding how the user 308 accesses content. For example, a user 308 may access a weather or traffic application on the client device 316 at the user's house (e.g., premises 102a) every weekday morning at 07:00 before the user 308 leaves to go to work. Thus, the user 308's historical data 328 may include that the user accesses a weather or traffic application every weekday morning at 07:00. If the user 308 then accesses a news program such as the Today Show at 07:30 until the user 308 leaves for work at 08:00, the historical data 328 may reflect that the user typically watches a news program (which may specifically be the Today Show) from 07:30-08:00 on weekdays.

In some embodiments, the local office 103 may obtain other information from the user 308, such as a location of the user. In one example, the local office 103 may obtain location information using a GPS device associated with the user 308 (such as found in the client device 316, the computing device 302, or a vehicle used by the user 308). Thus, after the user 308 leaves for work at 08:00, the local office 103 may determine how long it takes the user 308 to arrive at a destination (e.g., an office building). All of this information (such as location information, timing information, user behavior, etc.) may be included in the historical data 328. Additionally, the historical data 328 may also reflect whether the user accessed any content on the way to work.

In some embodiments, the local office 103 may determine historical data for a particular the client device 316. In such cases, the historical data may not directly correspond with the particular viewing habits and behavior of a specific user 308, but may correspond with one or more users' behavior regarding accessing content on that particular the client device 316. For example, a family may include a dad (the user 308), a mom (the user 310), a child (the user 312), and the family may own and access a set-top box (the client device 316). The dad may access on the client device 316 a weather or traffic application at 07:00 every weekday, the mom and dad may access a news program (The Today Show) from 07:30-08:00 every weekday, the dad may pick up the child from school, come home, access a kids program (SpongeBob) from 16:30-17:00 every weekday, the dad may access a gaming application from 17:00-18:00 every weekday, the mom and dad may access the evening local news from 18:00-19:00 every weekday, the dad may access a sporting event (football game) from 19:00-22:00, and the mom may access a drama or reality show (Downton Abbey or The Voice) from 22:00-23:00. Thus, the historical data for the client device 316 may reflect all of the above information.

In some embodiments, content may be accessed on different platforms, such as DVR, on-demand (music or video), linear, and the like. For example, the user 308 may watch SpongeBob at 16:30 using a video on-demand platform on weekdays. Thus, the historical data 328 may reflect that the user 308 tends to watch SpongeBob at 16:30 using a video on-demand platform on weekdays. In some embodiments, the local office 103 may gather historical information from scheduled and previously scheduled recordings found on a user's DVR. For example, the user 308 may record The Today Show from 08:00-09:00 using a DVR and watch the recorded segment from 17:00-18:00 every weekday. Thus, the historical data 328 may reflect that the user 308 tends to record the Today Show from 08:00-09:00 using a DVR and watch the recorded segment from 17:00-18:00 every weekday.

In some embodiments, the user 308 may vary the length of time the user 308 accesses a particular content item. For example, the user 308 may tend to watch a recording of the Today Show 17:00-18:00 every weekday. But if there is a cooking segment during the recorded broadcast of the Today Show, the user may tend to stop accessing the recording (e.g., stopping the recording) when that cooking segment approaches or happens, and may tend to switch to a 24 hour news channel (e.g., MSNBC) until 18:00. At 18:00, the user 308 may then tend to watch the local evening news until 19:00. Thus, the historical data 328 may reflect that the user 308 tends to watch a recording of the Today Show 17:00-

18:00 every weekday, but if there is a cooking segment during the recording, the user tends to switch from the recording and watch a 24 hour news channel (e.g., MSNBC) until 18:00, and then the local evening news from 18:00-19:00. The local office 103 may use contextual features of the recorded content item (e.g., the Today Show) to determine that the user 308 tends to stop watching the recording if there is a cooking segment. For example, the local office 103 may determine all of the times that the user 308 has stopped watching the recording of the Today Show. The local office 103 may then look to the contextual features of all of those recordings in which the user 308 stopped watching. The local office 103 may then determine that there are similarities between the episodes, such as all (or most) of the episodes contain a cooking segment. The local office 103 may also determine at which point during the playback of the recording the user 308 stop accessing a recording. The local office 103 may also determine which events happened immediately before and immediately after the point in which the user 308 stopped accessing the recording to assess any pattern or trend in the user's behavior. Thus, the local office 103 may determine, over the course of several recordings in which the user 308 stopped accessing, which contextual features (such as cooking segments) are most common in the recordings in which the user 308 stopped accessing.

In some embodiments, the user 308 may access applications on the client device 316. Such applications may include internet applications, weather or traffic applications, music applications, fitness applications, social media applications, picture sharing application, gaming application, shopping applications, fantasy sports applications, and the like. In such situations, the local office 103 may include in the historical data 328 which applications the user 308 may have accessed, and when the user 308 accessed the applications. Also, the local office 103 may also determine contextual features of content from the applications. For example, the local office 103 may determine to which types of music the user 308 listens and at which times the user 308 listens to certain types of music. The local office 103 may determine at what point in a song a user changes to another application or song.

In some embodiments, external environmental factors, such as traffic and weather, may affect a user's behavior in regard to accessing content. For example, the local office 103 may determine (and store as the historical data 328) that after the user 308 checks a traffic application, if the traffic for the user 308's commute is good for that day, then the user 308 may listen to music, access an application, or access content for a longer period (e.g., longer than a scheduled time period) than the user 308 would if the traffic was not good for that day. In a similar example, the local office 103 may determine (and store as the historical data 328) that after the user 308 checks a weather application, if the weather is good for that day before the user 308 leaves for the user's commute to work, then the user 308 may listen to music, access an application, or access content for a longer period than the user 308 would if the weather was not good for that day.

In another example, the local office 103 may determine (and store as the historical data 328) that when the user 308 is accessing a gaming application on the client device 316, such as playing a video game, that if the user 308 is doing well in the video game (e.g., by examining contextual features, such as score, lives, etc. of the video game), then the user 308 tends to keep playing the video game and not access other content on the client device 316. Additionally, the local office 103 may determine that when the user 308 is doing poorly in the video game, then the user 308 tends to abandon the video game, and access other content on the client device 316. In another example, the local office 103 may determine (and store as the historical data 328) that when the user 308 is accessing a shopping application, the user tends to concurrently access content with little contextual variance from episode to episode (e.g., content that may follow the same general story with little to no deviation between episodes), such as SpongeBob Square Pants, instead of content with more contextual variance, such as a sporting event. The local office 103 may also determine that the user 308 tends to pause (or stop accessing) the concurrently accessed content (e.g., SpongeBob) when the user 308 desires to access, view, and/or buy an item using the shopping application.

At step 406, the local office 103 may use historical data obtained in step 404 to determine a user profile describing which types of content (e.g., sports, news, drama, movie, traffic, gaming, etc.) a user tends to access and which times and days/dates the user tends to access those types of content. The user profile (e.g., the user profile 322) may correspond to a user (e.g., the user 308) and/or a user's historical data (e.g., the historical data 328). Thus, the local office 103 may analyze and/or use the historical data 328 to determine and/or create a user profile 322 for the user 308. The user profile 322 may be composed of one or more content recommendation periods. Each content recommendation period may correspond to a time/time period and/or a content type/classification. Each content recommendation period may also correspond to a day or date.

For example, after analyzing the historical data 328, the local office 103 may determine that the user 308 (or the client device 316) tends to access on the client device 316 a traffic application at 07:00 every weekday, access a news program from 07:30-08:00 every weekday, access a kids program from 16:30-17:00 every weekday, access the evening local news from 18:00-19:00 every weekday, access a sporting event from 19:00-22:00 on Sundays, Mondays, and Thursdays, and access a drama from 22:00-23:00 every weekday. A shown in the above example, a content recommendation period may correspond to a particular day of the week (such as the sporting event being on Sundays, Mondays, and Thursdays). Also, a content recommendation period may correspond to a period of time (such as the kids program from 16:30-17:00) or a particular start time with no particular end time (such as the traffic application at 07:00).

Figure 5:
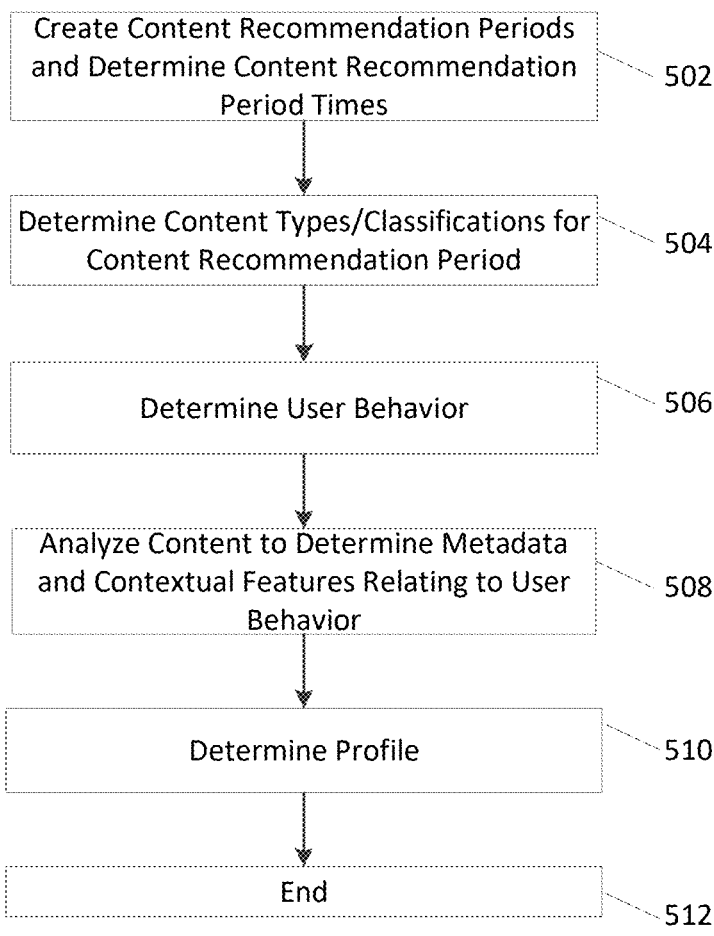
FIG. 5 illustrates an example flow diagram of a method in accordance with aspects of the present disclosure.

FIG. 5 is an exemplary flow diagram illustrating an example process 500 detailing exemplary steps for determining a profile, as described in step 406 in FIG. 4. In one or more embodiments, the process illustrated in FIG. 5 and/or one or more steps thereof may be performed by one or more computing devices (e.g., the input device 314, the client device 316, computing devices, 302, 304, and 306, the local office 103, one or more content providers, and the like). In other embodiments, the process illustrated in FIG. 5 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

FIG. 5 may begin at step 502, in which the local office 103, using the historical data 328, may create one or more content recommendation periods and determine for each content recommendation period a corresponding time period, which may, for example, be segments or portions of a day. The content recommendation periods may be of equal lengths (e.g., 30 minutes each) or of non-equal length (e.g., 15 minutes, 30 minutes, and 1 hour content recommendation periods). For example, the user 308 may tend to access content on the client device 316 at 07:00 every weekday, from 07:30-08:00 every weekday, from 16:30-17:00 every weekday, from 18:00-19:00 every weekday, from 19:00-22:00 on Sundays, Mondays, and Thursdays, and from 22:00-23:00 every weekday. Thus, using this historical data 328 of the user 308, the local office 103 may determine that as part of the user profile 322 for the user 308, content recommendation periods may be made for 07:00 every weekday, from 07:30-08:00 every weekday, from 16:30-17:00 every weekday, from 18:00-19:00 every weekday, from 19:00-22:00 on Sundays, Mondays, and Thursdays, and from 22:00-23:00 every weekday. In some embodiments, content recommendation period times may be made for particular days, such that content recommendation period times may be made for any day of the week, month, or year. In some embodiments, content recommendation period times may be of varying length.

According to some aspects, the local office 103 may dynamically change content recommendation period times as the local office 103 receives additional historical data 328. For example, if the user 308 begins to watch a sports talk show some weekdays from 07:15-08:00 instead of watching a news program from 07:30-08:00, then the local office 103 may use this additional historical data (e.g., the user 308 watching a sports talk show some weekdays from 07:15-08:00) in determining whether to implement a content recommendation period time from 07:15-08:00 instead of 07:30-08:00 for those weekdays. Additionally, content recommendation periods may be seasonal. For example, the user 308 may watch professional football from 19:00-22:00 on Sundays, Monday, and Thursdays during the professional football season (e.g., from August-February), but may tend to only access movie content from 19:00-20:00 and 21:00-22:00 on Sundays, Monday, and Thursdays during the months of March-July. Thus, the local office 103 may assign content recommendation period times to reflect the change of content seasons (such as sports seasons, sitcom seasons, and the like).

At step 504, the local office 103 may determine content types/classifications, such as for each determined content recommendation period time of the day. For example, local office 103 may determine that the user 308 (or the client device 316) tends to access on the client device 316 a traffic application at 07:00 every weekday, access a news program from 07:30-08:00 every weekday, access a kids program from 16:30-17:00 every weekday, access the evening local news from 18:00-19:00 every weekday, access a sporting event from 19:00-22:00 on Sundays, Mondays, and Thursdays, access a drama from 22:00-23:00 every weekday, and access a movie from 20:00-22:00 every Saturday. Thus, the local office 103 may assign content recommendation periods (e.g., content recommendation period times and content types) of a traffic application at 07:00 every weekday, a news program from 07:30-08:00 every weekday, a kids program from 16:30-17:00 every weekday, the evening local news from 18:00-19:00 every weekday, a sporting event from 19:00-22:00 on Sundays, Mondays, and Thursdays, a drama from 22:00-23:00 every weekday, and a movie from 20:00-22:00 every Saturday. In some embodiments, a content type may also include an application, such as traffic, music, fitness, gaming, shopping, or weather applications.

In some embodiments, the local office 103 may assign a particular content item (e.g., a particular show) to a content recommendation period time period. For example, if the user

308 tends to primarily access the Today Show from 07:30-08:00 every weekday (e.g., over 90% of the time), then the local office 103 may assign the Today Show to that content recommendation period time period instead of a general news content type.

At step 506, the local office 103 may determine, using the historical data 328, user behavior with regard to metadata and contextual features of content found in the user's history (e.g., the historical data 328). As stated above, the historical data 328 may include the behavior of the user 308 regarding how the user 308 accesses and/or interacts with content. Thus, in some embodiments, the user 308 may vary the length of time the user 308 accesses a particular content item. As in the above example, the user 308 may tend to watch a recording of the Today Show 17:00-18:00 every weekday. But the local office 103 may determine that the user 308 stops accessing or changes to another content item during some of the recordings. In other examples, the local office 103 may determine that the user 308 fast forwards, rewinds, pauses, records, changes volume, and the like while accessing a content item. Thus, the local office 103 may determine various behaviors the user 308 may make while accessing a content item.

The local office 103 may also determine metadata and contextual information of the content items found in the historical data 328. These content items may be items previously accessed by the user 308, and may be content items in which the user stopped accessing before the scheduled end of the content item. For example, the user 308 may tend to watch a recording of the Today Show 17:00-18:00 every weekday. Thus, the local office 103 may assign a content recommendation period time of 17:00-18:00 every weekday with a news (or Today Show) content type/classification. The local office 103 may then determine that the user 308 stops accessing some of the recordings (e.g., stopping the recording) before the end of the content recommendation period time. Thus, the local office 103 may then access contextual information of the recordings in which the user 308 stopped accessing (or all of the recordings/content items).

In one example, the user 308 may stop accessing a recording (out of several recordings of the Today Show) when there is a cooking segment using beef. In another example, the user 308 may fast forward when there is a musical act. In another example, the user 308 may pause and rewind when there is a weather segment. In another example, the user 308 may stop accessing a live, recorded, or on-demand sporting event when the user 308's favorite football team is losing by a lot of points, or when there are less than 20 highlight plays in a football game, or when teams located far from the user's location are playing.

In some embodiments, the user 308 may access a content item for an entire content recommendation period time period or for even longer than the content recommendation period time period. For example, professional football games are generally 3 hours in length. But in some cases, a game may last longer than 3 hours (such as due to it going into overtime, a lot of injury timeouts, a lot of incomplete passes, an event scheduled before the game going over its scheduled time slot, etc.). Accordingly, in some cases, the user 308 may continue to watch a football game past a content recommendation period time period (such as past 22:00) and into another content recommendation period time period. Thus, contextual features from that game may be analyzed to determine whether any of those contextual features relate to the user's behavior (e.g., continuing to watch the game and/or not going to a recommended next content recommendation period). For example, the user may continue to watch the game if the game is very close, if the user's favorite team is playing, or if it is a special game (such as a championship game).

In some embodiments, the user 308 may tend to always access (e.g., watch live, watch on-demand, or record) a content item if the content item is a new episode of a show. Thus, the local office 103 may analyze metadata of various content items and determine whether there are any "new" episodes. Similarly, the user 308 may tend to never access a content item if the content item is not a new episode of a show. For example, the user 308 may always switch to and watch a linear transmission of a new episode of "Suits" during a time slot of 21:00-22:00, but may not switch to and watch a linear transmission of a repeat episode of "Suits" during that time slot.

At step 508, the local office 103 may perform sensitivity analyses and machine learning techniques to determine the metadata and contextual features relating and/or corresponding to a user's behavior and/or expected/predicted user behavior. Thus, there may be many contextual features in a content item. According to some aspects, the local office 103 may determine a correlation between contextual features of applications (such as weather, gaming, shopping, or traffic, etc.) and a user's behavior. Such contextual features may include whether there is a cooking segment, whether there is a chase scene in a program, whether the score of a football game is 35-7, whether it is raining outside (e.g., derived from a weather application), whether there was a world record set in an Olympic event such as speed skating, etc.

Accordingly, for a given content item, such as a football game, the local office 103 may determine which contextual features may mean more to a user's behavior (e.g., more likely to affect a user's behavior, such as switching channels). These contextual features may include which teams are playing, the score, the time remaining, and the like. For example, the local office 103 may determine that if the user 308's favorite team is playing, the user will tend to abandon the game less frequently than if the user 308's favorite team was not playing. Also, the local office 103 may determine that when the user 308's favorite team is winning, the user 308 abandons the game even less frequently when the user 308's favorite team is just playing (e.g., when the team may be either winning, losing, or tied).

In one example, the user 308 may tend to stop accessing the Today Show when there is a cooking segment while accessing the show on any platform (e.g., live, recorded, on-demand, etc.). Thus, the local office 103 may determine that the user 308 abandons some of the recordings of the Today Show. The local office 103 may then analyze and determine contextual features of those recordings in which the user 308 stop accessing. These contextual features may include features such as the hosts of the Today Show hosting outside the studio during some of the recordings, a musician performing during some of the recordings, holiday decorations, whether or not there is a weather segment, and the like. Some or all of these contextual features may or may not relate to and/or cause the user 308's behavior. To determine which contextual features relate to the user 308's behavior, the local office 103 may determine which contextual features tend to frequently show up across the recordings of the Today Show. As in the above example, the local office 103 may determine that there may be similarities between the episodes in which the user 308 stops accessing, such as all of the episodes contain a cooking segment. The local office 103 may determine when a contextual feature appears/occurs in a recording, and then may determine those contextual features having the highest number of appearances/ occurrences (e.g., ranking the contextual features based on occurrence). Higher ranked contextual features may then be determined to be the contextual features that affect the user 308's behavior (e.g., abandoning the recording of the Today Show when there is a cooking segment).

In one example, out of 100 recordings of the Today Show, the user 308 may have abandoned the show 40 times, and out of those 40 times, there has been a cooking segment 35 times, there has not been a weather segment 20 times, there has been a musical performance 4 times, the hosts have hosted outside 8 times, and the like. From these four contextual features, the local office 103 may determine that the user tends to abandon when there is a cooking segment. In some embodiments, a user's behavior may be based on a combination of features. For example, if out of the 35 recordings in which a cooking segment aired, 20 of them did not have a weather segment. Therefore, the local office 103 may determine that the user is even more likely to abandon when there a recording of the Today Show that contains a cooking segment and does not a weather segment than when there is only a cooking segment.

In some embodiments, the local office 103 may also determine at which point during the playback of the Today Show the user 308 stopped or abandoned the playback (e.g., stopped accessing). The local office 103 may use this information in determining which contextual features affect the user 308's behavior. The local office 103 may determine what contextual features happened immediately before and immediately after the point in which the user 308 stopped accessing the recording to determine any pattern(s) in the user's behavior. Additionally, the point/time in the playback in which the user 308 abandoned (or other behavior such as fast forward, rewind, pause, record, modify volume, voice command, etc.) the content item may help in narrowing down a collection of many different contextual features. Also, the local office 103 may give a higher weight or preference to contextual features that are closer to an abandoning point than contextual features that are farther away from the abandoning point.

In some embodiments, the local office 103 may analyze contextual features of applications running on the client device 316. For example, the local office 103 may determine from a weather application that the weather is good. In other situations, the local office 103 may obtain weather from other sources, such as from broadcasted content (e.g., from a weather channel), by having a user input the weather, and the like. In some situations, the local office 103 may obtain the weather via a weather station connected to a premises that contains (or otherwise associated with) the client device 316. Such a weather station may be part of a home automation system that may be maintained and/or accessible by the local office 103. Good weather may include situations in which a percentage of rain for the day may be less than 30%, the temperature may be around the average mark for that time of year or season of the year, and the like. In other embodiments, good weather may include situations in which a deviation from an expected weather condition satisfies a threshold. For example, in Chicago during winter, one may expect the weather to be cold and snowy. Thus, a good weather condition may be cold and snowy. But in the summer, cold and snowy may be a bad weather condition. Again, using statistical techniques, the local office 103 may determine which types of weather may affect a user's behavior. For example, if the weather is good, then the user 308 may watch television longer than the user would if the weather was not good for that day. For example, it may take the user 308 a shorter time to get to work if the weather is good, thus giving him more time to consume/access content (e.g., watch television). Similarly, the local office 103 may determine other external environmental factors in a similar manner as weather. For example, the local office 103 may determine (e.g., via a traffic application or other method) that if the traffic for the user 308's commute is good for that day (e.g., traffic moving at substantially the speed limit and/or no accidents, and the like), then the user 308 may watch television longer than the user would if the traffic was not good for that day.

In another example, the local office 103 may determine using statistical techniques, the local office 103 may determine which types of video game outcome may influence a user's behavior from that the user 308 is doing poorly in a video game. For example, if the user 308 is accessing a gaming application running on the client device 316, and the user 308 is doing poorly in a video game, the user 308 may abandon the gaming application and switch to an on-demand horror movie. Similarly, if the user 308 is doing great in a video game, the user 308 may continue playing the video game on the gaming application, and may not switch to other content on the client device 316. In another example, the local office 103 may determine from a fantasy football sporting application that the user 308's fantasy football team is doing very well (e.g., scoring more points than any other team in the fantasy football league), and thus the user 308 may access a program corresponding to a mood of the user 308, such as a comedy show. If the user 308's fantasy football team is doing poorly, then the user 308 may access sadder content, such as a dark drama or horror program.

At step 510, the local office 103 may determine the user profile and/or content recommendation period schedule based on the results of both step 506 (e.g., the user behavior with regard to metadata and contextual features of content found in the user's history, as well as metadata and contextual information of the content items found in the historical data 328), and step 508 (e.g., the contextual features relating to a user's behavior and expected/predicted user behavior). Thus, each content recommendation period's content type/ classification and/or time period may be specific to contextual features of content accessed by the user 308, and/or specific to the behavior of the user 308 related those contextual features. Thus, for each content recommendation period, there may be several candidates for content type and several candidates for time period, which may be based on the contextual features of a content item, like a show. This will be further described below in more detail. The process 500 may then end at step 512. According to some aspects, the process 500 may end after any of the steps in the process 500. Any of the disclosed steps in FIG. 5 may be omitted, be performed in other than the recited order, repeated, and/or combined.

Returning to FIG. 4, and after determining a profile for the user 308 (or for the client device 316), the process 400 may continue to step 408. At step 408, the local office 103 may determine/recognize a user interaction with the client device 316. A user interaction may be a situation in which a user, such as the user 308, may interact with the client device 316 and/or may desire to access (e.g., watch) content using the client device 316. For example, the user 308 may turn on a television and set-top box, and may watch a television program. In another example, the user 308 may access an application, such as weather, traffic, music, gaming, or internet applications.

In some embodiments, the user 308 may interact with the client device 316 using the input device 314. For example, the user 308 may use a remote control to enter a command (e.g., make a content selection) into the client device 316. The user 308 may do this by entering a number key, an operations key (e.g., "Enter," "Select," etc.), or any other key on the remote. Thus, the local office 103 may determine that the user has interacted with the client device 316 after the local office 103 receives a message from the client device 316 that includes which command the user 308 entered. In some embodiments, the local office 103 may then transmit content to the client device 316 in response to this user interaction (e.g., in response to the remote control command).

In some embodiments, the user 308 may interact with the client device 316 via a motion sensor, which may be the input device 314, and may be operably connected to the client device 316. In this situation, the motion sensor may detect a user's presence, a user's movement, when a user approaches the client device 316 or to the motion sensor, and the like. In some embodiments, there may be a threshold associated with the motion, such that the client device 316 or the input device 314 may detect a user interaction after the user 308 moves at a particular speed. In some situation, there may also be threshold proximity, such that the client device 316 or the input device 314 may detect a user interaction after the user 308 moves within a particular proximity of the client device 316 or the input device 314. The client device 316 may then transmit a message to the local office 103 indicating this user interaction.

According to some aspects, the client device 316 may detect user interaction after a user may have moved the input device 314, such as by picking up a remote. According to some aspects, the client device 316 or the input device 314 may detect vibration as a user interaction, such as when a person walks, closes a door, or opens a door. In these situations, the input device 314 may comprise an accelerometer or other element configured to detect movement of the input device 314. The client device 316 may then transmit a message to the local office 103 indicating this user interaction.

According to some aspects, the client device 316 may detect user interaction after detecting a computing device and/or wireless device, such as a smartphone, laptop, tablet, smartwatch, or BLUETOOTH device (e.g., devices 302, 304, or 306). For example, the user 308 may be associated (e.g., own or possess) with a smartphone (the device 302), the user 310 may be associated with a BLUETOOTH device (the device 304), and the user 312 may be associated with a tablet (the device 306). The users 308, 310, and 312 may have previously registered their respective devices with the local office 103 (such as via a cable or internet account). Thus, after the client device 316 detects the device 302, the client device 316 may register a user interaction for the user 308. Similarly, after the client device 316 detects the device 304 and the device 306, the client device 316 may register a user interaction for the user 310 and the user 312. Detecting various users may trigger the client device 316 and/or the local office 103 to implement corresponding profiles (e.g., profiles 322, 324, and 326). In such situations, the client device 316 and/or the local office 103 may determine which profile to implement, or may implement more than one profile. This will be described below in more detail. In one example, the user 308 may drive the user 308's car into the user 308's garage, and the car may join (e.g., via a wireless connection) the network 318 and/or connect to the user 308's home automation system. The client device 316 may then detect the user 308's car and/or that the user 308's car has connected to the network 318 or the home automation system, and thus may register a user interaction for the user 308 based on the detection of the user 308's car.

According to some aspects, the user 308 and/or the device 304 may leave a proximity of the client device 316 (or some other means of not being detected by the local office 103 and/or the client device 316), and thus the client device 316 may no longer detect the user 308 and/or the device 304. In such situations, the client device 316 and/or the local office 103 may then optionally stop implementing a profile (e.g., the user profile 322) associated with the user 308, and may implement a profile (e.g., the user profile 324) associated with any other detected user (e.g., the user 310). Similarly, if the user 308 then returns to be within a close proximity (or otherwise be detected) to the client device 316, the local office 103 may optionally begin to implement the profile associated with the user 308 (e.g., the user profile 322). Such implementation may be based on a hierarchy associated with the profiles (which will be discussed later). Thus, the local office 103 may dynamically change the implementation of profiles.

According to some aspects, the client device 316 may detect user interaction via a prompt. For example, local office may display a on a display of the client device 316 asking whether a user is interacting with the client device 316 or whether a user would like to load a particular profile. In such situations, a user may select, using an input device 314 such as a remote, keyboard, mouse, touch screen, a profile to load onto the client device 316. The profile may be specific to a user or client device, depending on the user's selection.

Other methods of interacting with the client device 316 include using a microphone or camera. With the microphone, the client device 316 and/or the local office 103 may perform speech recognition to detect a command and/or a particular user. For example, the user 308 may want to access a weather application or a weather related program, and may say "weather" into a microphone. The local office 103 may then provide content or a recommendation based on this command. In the case of a camera, the client device 316 may perform facial recognition to determine a particular user.

In some embodiments, the local office 103 may assign a profile form among a plurality of different profiles based on which type of user interaction the local office 103 and/or the client device 316 detected. For example, if the time is 07:00, and the user 308 says "weather" into a microphone (e.g., the input device 314), that user interaction may trigger a particular profile for the user 308. This profile may be, for example, a work day profile, because the local office 103 may determine that the user 308 tends to say "weather" into the microphone before going to work most days. The local office 103 may determine that the user 308 is going to work based on a GPS device or the user's viewing patterns (e.g., not accessing content on the client device 316 during work hours). In another example, a microphone (e.g., the input device 314) may detect other external environmental factors, such as a barking dog at the time of 15:00, because a mailman is approaching the user 308's house. Because mail may be delivered on particular days of the week (e.g., Monday-Friday or Monday-Saturday), a profile for those particular days may be implemented based on the detecting of the barking dog at the time of 15:00. The local office 103 may use other external environmental factors according to aspects disclosed herein.

Additionally, a profile may be selected based on contextual features of applications. For example, the local office 103 may determine that the user 308 tends to work from home on snowy days. The local office 103 may then assign a snowy day profile based on based on a weather application running on client 316 indicating it is snowing or going to snow. Thus, the snowy day profile may include content recommendation periods during the day at times in which the user 308 may usually be at work (such as on a non-snowy day). Additionally, a snowy day profile may contain content recommendation periods having content types/classifications corresponding to the contextual features obtained by the local office 103. For example, content types for a snowy day profile may include content associated snow, such as programs related to Christmas, winter, snowmen, hot chocolate, salt and ice melting, storm preparation, and the like. In another example, the local office 103 may determine that the user 308 tends to access content with little contextual variance (e.g., SpongeBob) while accessing a shopping application. The local office 103 may then assign a shopping profile (e.g., a profile with content having little contextual variance) when the user 308 accesses a shopping application.

At step 410, the local office 103 may, in response to detecting a user interaction, assign a content recommendation period based upon a selected profile (e.g., profiles 322, 324, or 326). Depending on which profile the local office 103 implements, the local office 103 may implement a content recommendation period from that selected profile. As stated above, a profile may be composed of different content recommendation periods. Each content recommendation period may have a content recommendation period time (e.g., start time or time period) and/or an assigned content type/classification (e.g., news, kids, sports, weather application, etc.).

Thus, after the local office 103 detects a user interaction and assigns a profile, the local office 103 then may assign a content recommendation period having a content recommendation period time period that may include the current time. For example, if the current time is 16:06, and the selected profile (e.g., the user profile 322) has a content recommendation period with a content type of kids and a content recommendation period time period of 16:00-16:30, then the local office 103 may assign this content recommendation period. Additionally, if the current time is 16:00, then the local office 103 may also assign this content recommendation period with a content recommendation period time period of 16:00-16:30.

In other cases, the local office 103 may assign a content recommendation period having a content recommendation period start time that is about to begin and/or approaching (e.g., in the future). For example, the user 308 may tend to not access content from the client device 316 between 23:00-07:00, but may have a content recommendation period for a weather application starting at 07:00. In this situation, if the client device 316 detects a user interaction at 06:55, then the local office 103 may assign the content recommendation period for the weather application because the content recommendation period time of 07:00 is approaching.

In some embodiments, the local office 103 may implement a plurality of profiles at step 408, such as profiles 322, 324, and 326 corresponding to the users 308, 310, and 312. Thus, at step 410, the local office 103 may optionally assign a content recommendation period from one of these profiles. In some cases, a user may select (e.g., via a prompt provided by the client device 316) one of the profiles 322, 324, and 326 to implement. In other situations, the local office 103 may determine a consensus content recommendation period that may satisfy all of the assigned profiles. The local office

103 may determine a consensus content recommendation period using a predetermined hierarchy, which may have been established by one or more users, or may be determined by the local office 103. The local office 103 may determine the hierarchy based on a how frequent a profile is implemented on the client device 316. For example, after selecting profiles 322, 324, and 326, the local office 103 may select the user profile 322 if the user profile 322 has been implemented more frequently than either of profiles 324 and 326. Additionally, after implementing the user profile 322, the local office 103 may still recommend content items (such as later in the process 400) using information from the user profile 322's content recommendation periods (e.g., timing and/or content types), but also accounting for historical data of other users, such as the historical data 330 and 332 corresponding to users 310 and 312. This will be described below in more detail.

In some embodiments, the local office 103 may assign a particular content recommendation period based on the type of user interaction. For example, if the user 308 approaches client 316 or if client 316 detects a wireless device of the user 308 (e.g., the device 302), then the user 308 might not desire to watch a video, and client 316 may assign an application content recommendation period (such as by displaying traffic, weather, social media, time, etc.). If, for example, the user uses a remote to access content, then the local office 103 may assign a programing content recommendation period (such as news, movie, kids, etc.) instead of an application content recommendation period.

At step 412, the local office 103 may determine the amount of time remaining in an assigned content recommendation period. For example, if the current time is 16:06, and the selected profile (e.g., the user profile 322) has a content recommendation period with a content type of kids and a content recommendation period time period of 16:00-16:30, then the local office 103 may assign this content recommendation period and determine that there are 24 minutes left in this content recommendation period. Similarly, the local office 103 may also determine the amount of time until the next content recommendation period. For example, the user 308 may tend to not access content from the client device 316 between 23:00-07:00, but may have a content recommendation period for a weather application starting at 07:00. In this situation, if the client device 316 detects a user interaction at 06:55, then the local office 103 may determine that there is 5 minutes until the weather application content recommendation period. In such situations, the local office 103 may then assign the weather application content recommendation period at 06:55 or may wait until 07:00 to assign it. In some cases, local office may assign one content item for the 5 minutes, and then assign the weather application at 07:00.

At step 414, after selecting a content recommendation period having a content recommendation period time and content type, and after determining the amount of time remaining in the selected content recommendation period, the local office 103 may analyze and retrieve prospect content assets whose content type may correspond to the assigned content recommendation period's content type and/or whose length may correspond to the time remaining in the content recommendation period. For example, if the current time is 16:06, and the selected profile (e.g., the user profile 322) has a content recommendation period with a content type of "kids" and a content recommendation period time period of 16:00-16:30, then the local office 103 may assign this content recommendation period and determine that there are 24 minutes left in this content recommendation period. The local office 103 may then retrieve content assets, such as from content assets analyzed in step 402 or other content received from the content sources 334, having a content type of "kids" and a length of approximately 24 minutes. In some cases, a selected content item's length may not exactly match a time remaining in a content recommendation period. In these situations, the local office 103 may retrieve content having length that is in the vicinity of the time remaining in the content recommendation period (e.g., substantially matches). In the above example, the local office 103 may retrieve content items having a length of 20-40 minutes. But the local office 103 may give precedence to content items having a length that most closely matches the time available in a content recommendation period over other content items.

The analyzed content assets may include assets configured for any content platform, such as internet, linear, DVR, on-demand, music, and applications (e.g., traffic, weather, social media). In some embodiments, the content assets may be on-demand or DVR platform assets, and a user may have the ability to access these on-demand or DVR assets at any time. Thus, the local office 103 may be able to recommend on-demand or DVR assets for access by a user at any time during a profile's schedule. In some embodiments, the content assets maybe linear or live platform assets, and a use may only have the ability to access these assets during a live broadcast. Thus, the local office 103 may be able to recommend linear assets for access by a user during a live broadcast of those linear assets. This will be discussed below in more detail with regard to the recommendations made by the local office 103.

At step 416, the local office 103 may then determine, assign weights to, and rank candidate content assets from the prospect content assets. The local office 103 may determine these candidate content assets by assigning weights to prospect content assets based on analyzing metadata and contextual features of the prospect content assets and determining the amount of correlation between the metadata and contextual features and a user's profile (e.g., the user profile 322), historical data (e.g., the historical data 328), and/or behavior. The local office 103 may have previously analyzed the metadata and contextual features of the prospect content assets in step 402, but may also analyze the metadata and contextual features of the prospect content assets here at step 416. The local office 103 may then rank the candidate content assets according to their assigned weight.

In one example of the local office 103 assigning weights based on metadata and contextual features, the user profile 322 and/or the historical data 328 may indicate that the user 308 tends to watch professional football on Mondays from 19:00-22:00, Thursdays at 20:00-23:00, and Sundays at 19:00-22:00. The user profile 322 may also indicate that the user tends to watch football games that include the user's favorite team, and tends keep watching games that include the user's favorite team until the end of the content recommendation period time. In this case, football games that include the user's team may be weighted higher than other football games.

Continuing with the previous example, the user profile 322 may also indicate that the user 308 tends to switch from the user's favorite team's football game if the user's favorite team is losing by 21 or more points, but may tend to watch any football game if both the score of the two teams is within 7 points and there has been at least 20 highlight plays in the game. Thus, if the local office 103 retrieves prospect content assets containing 1) a live football game having the user 308's favorite team losing by 28 points, and 2) a live football game not including the user 308's favorite team, but having a score of the two teams within 7 points and there has been 24 highlight plays in the game, then the local office 103 may give a higher weight to the second game with the score of the two teams within 8 points and having at 24 highlight plays in the game.

In another example, the local office 103 may determine that profile 322 and/or the historical data 328 may indicate that the user 308 tends to watch professional football on Mondays from 19:00-22:00, Thursdays at 20:00-23:00, and Sundays at 19:00-22:00, and access a drama from 22:00-23:00 every day of the week. Profile 322 and/or the historical data 328 may indicate that whenever there is a new episode of Downton Abbey on Sundays at 22:00, the user 308 almost always watches the whole episode of Downton Abbey for the entire length of the content recommendation period time of 22:00-23:00. But professional football games sometimes go into overtime, and may last longer than an expected time (e.g., more than 3 hours). Thus, if the game has previously aired and the user is accessing it on DVR or on-demand, the local office 103 may analyze the metadata and contextual features of the football game and determine that the game lasted longer than three hours. The local office 103 may then provide the football game having a shorter length that fits into the content recommendation period's time period and/or ending at the end of the content recommendation period's time period, and thus not interfering with the next content recommendation period of Downton Abbey at 22:00.

In some situations, the user 308 may interact with the client device 316 in the middle of the content recommendation period time of 19:00-22:00 for professional football on Sunday. In these situations, the local office 103 may retrieve a content asset (e.g., football game) matching the remaining time left in the content recommendation period. Alternatively, the local office 103 may retrieve a shortened version of the game (e.g., such as only showing scoring plays or highlights, only showing the user's favorite team's offensive possessions, and the like, which may be derived from the user 308's behavior in relation to contextual features of the content asset) to substantially match the available time left in the content recommendation period.

In another example, local device 103 may determine the user profile 322 indicating that the user 308 tends to watch a recording of the Today Show from 17:00-18:00 every weekday. The user profile 322 may also indicate that if there is a cooking segment during the recorded broadcast of the Today Show, the user tends to switch from the recording of the Today Show to a 24 hour news channel (e.g., MSNBC) until the end of that content recommendation period (18:00). At 18:00, the user 308 may then tend to watch the local evening news until 19:00. Thus, after the client device 316 records the Today Show, the local office 103 may analyze and determine the metadata and contextual features of that recording. These contextual features may include whether the hosts of the Today Show hosted outside the studio, whether a musician performed, whether there was a holiday theme, whether there was a mistake made by a host, whether or not there was a weather segment, and the like. In this case, the local office 103 may determine that there was a cooking segment during the episode. Thus, referring to the user profile 322 which indicates that the user 308 tends to switch to MSNBC when there is a cooking segment during the recording of the Today Show, the local office 103 may provide a higher weight to MSNBC than to the recording of the Today Show for that content recommendation period having the content recommendation period time of 17:00-18:00.

In another example, the local office 103 may weight prospect content items based on contextual features derived from applications running on the client device 316. For example, the local office 103 may determine from a weather application that the current weather is snowy. In this case, the local office 103 may provide a higher weight to content items associated with snow, such as movies or shows set in the winter or around Christmas.

In some cases, weights may be assigned to content based on the popularity of a program, such as by using ratings, relevancy rankings, or any other method of determining popularity. The popularity of content may also be based on users within a particular proximity to the user 308, across demographics (e.g., age, sex, income, location, etc.), and the like.

At step 418, the local office 103 may then transmit to the client device 316 an indication of one or more of the higher ranked candidate content assets. The local office 103 may make such an indication with a recommendation for a particular candidate content asset. For example, the client device 316 may provide a prompt on a display recommending to the user 308 one or higher ranked candidate content assets for an assigned content recommendation period. In other situations, the local office 103 may transmit to the client device 316 the one or more of the higher ranked candidate content assets. In some cases, the local office 103 may indicate only a highest ranked candidate content asset. Additionally, the client device 316 may automatically access (e.g., play) one of the candidate content assets (such as a highest ranked candidate).

According to some embodiments, an indication and/or recommendation may be based on any data that may be available to local officer 103, such as any information that may have been gathered and/or any event (or interaction) that has or is currently happening. For example, an indication and/or recommendation may be based on a portion of a profile, a portion of the content recommendation period, and the like.

In one example, local device 103 may determine the user profile 322 indicating that the user 308 tends to watch a recording of the Today Show 17:00-18:00 every weekday. The user profile 322 may also indicate that if there is a cooking segment during the recorded broadcast of the Today Show, the user tends to switch from the recording of the Today Show to watch a 24 hour news channel (e.g., MSNBC) until the end of that content recommendation period (18:00). In this case, the local office 103 may determine that there was a cooking segment during the episode. According, referring to the user profile 322 which indicates that the user tends to switch to MSNBC when there is a cooking segment during the recording of the Today Show, the local office 103 may provide a higher weight to MSNBC than to the recording of the Today Show. Thus, the local office 103 may recommend watching MSNBC during the content recommendation period from 17:00-18:00 instead of the Today Show. In this example, the content type of the Today Show (e.g., news) may match the content type of MSNBC (e.g., news). But in another example, the user 308 may tend to switch to SpongeBob (e.g., kids content type) when the recording of the Today Show features a musical act. Thus, if the recording of the Today Show features a musical act, the local office 103 may recommend watching SpongeBob during the content recommendation period from 17:00-18:00 instead of the Today Show or MSNBC, because SpongeBob would be have a higher ranking or weight based on the local office 103's analysis of the Today Show's contextual features.

In another example, the local office 103 may analyze contextual features of applications running on the client device 316. The local office 103 may determine using a weather application that the weather is good (e.g., not raining). The user profile 322 may indicate a content recommendation period for 07:30-08:00 for news programming. The user profile 322 may also indicate that if the weather is good, then the user 308 may watch television longer than the user would if the weather was not good for that day. Accordingly, after the local office 103 analyzes the weather and determines that the weather is good, then the local office 103 may recommend additional content for the user 308 to access, because, as indicated in the user profile 322, the user 308 tends to watch more television when there is good weather. The additional content may also be based on the historical data 328, which may indicate specific types of content the user tends to watch. In some cases, the local office 103 may assign the weather a value, such as from 1 to 10, with 1 being the worst weather and 10 being the best weather. In these circumstances, the amount of extra time available for the user 308 to watch television may correspond to the assigned weather value. For example, if the weather is assigned a 10, then the user may have an extra 30 minutes to watch television. If the weather is assigned a 7, the user may have an extra 5 minutes to watch television. If the weather is assigned a 5, the user may not have any extra time to watch television, and may follow the content recommendation period time of 07:30-08:00. If the weather is assigned a 1, then the user may have to leave 15 minutes earlier, and may have 15 minutes less to watch television. In the situation where the weather is assigned a 10, the local office 103 may recommend a content asset to fill a one hour time period (e.g., from 07:30-08:30). Alternatively, the local office 103 may recommend a content asset for the original content recommendation period time of 07:30-08:00, and then pick one or more additional content assets to fill the remainder of the time. A similar approach may be used for when weather is assigned a 7 with 5 extra minutes. If the weather is assigned a 1, then the local office 103 may pick one or more content assets to fill the 15 minutes (e.g., from 07:30-07:45), which may be of the same content type as indicated in the content recommendation period.

In another example, the local office 103 may determine using a traffic application that the traffic is good (e.g., traffic moving at substantially the speed limit and/or no accidents). The user profile 322 may indicate a content recommendation period for 07:30-08:00 for news programming. The user profile 322 may also indicate that if the traffic is good, then the user 308 may watch television longer than the user would if the traffic was not good for that day. Accordingly, after the local office 103 analyzes the traffic and determines that the traffic is good, then the local office 103 may recommend additional content for the user 308 to access, because the user 308 tends to watch more television when the traffic is good. Additionally, as in the above weather example, the local office 103 may assign the traffic a value, such as from 1 to 10, with 1 being the worst weather and 10 being the best weather. The local office 103 may then base the amount of time available for extra content on this assigned value, and then determine corresponding content to recommend.

In another example, the user profile 322 may indicate that the user 308 tends to always watch a specific contextual feature, such as a hockey fight between four or more hockey players. Thus, the local office 103 may transmit a recommendation for (or automatically tune to) a content asset containing a hockey fight between four or more hockey players. In these situations, the recommended content may not match time period and/or content type of a currently assigned content recommendation period. But the local office 103 may make this recommendation because of the very close correlation between the user 308's behavior (e.g., always watching a fight between four or more hockey players) and the contextual features of a content item (e.g., content having a fight between four or more hockey players).

According to some aspects, the local office 103 may examine a social media application on the client device 316 for contextual features that may relate to the user 308's behavior. For example, the local office 103 may analyze social media feeds or posts from friends of the user 308 or people unknown to the user 308 to determine contextual features in these feeds or posts. Such contextual features may include internet content, popular television shows or scenes from those shows, popular movies or scenes from those movies, popular sporting events or plays/acts from those events, and the like. From these contextual features, the local office 103 may then recommend content according to the user 308's behavior. For example, the user profile 322 may indicate that the user 308 tends to always watch a specific contextual feature, such as a hockey fight between four or more hockey players. If the local office 103 determines from the contextual features of a social media application that a hockey fight between four or more hockey players is currently airing, then the local office 103 may transmit a recommendation for (or automatically tune to) the currently airing content asset containing a hockey fight between four or more hockey players. Alternatively, if the hockey fight is on a video-sharing website or on-demand platform, then the local office 103 may recommend content on those mediums and/or platforms to the user 308.

According to some aspects, the client device 316 may detect user interaction after detecting more than one user (e.g., the users 308 and 310), and thus may determine consensus content candidates. Detecting various users may trigger the client device 316 and/or the local office 103 to implement corresponding user profiles (e.g., profiles 322 and 324). In such a situation, a user may select (e.g., via a prompt provided by the client device 316) one of the profiles 322 or 324 to implement. In other situations, the local office 103 may determine a profile to implement using a hierarchy (discussed above). The local office 103 may further analyze the historical data 328 and 330 (corresponding to the users 308 and 310) to determine user behavior and/or viewing patterns of the users 308 and 310. After selecting a profile to implement (e.g., the user profile 322), the local office 103 may assign weights to prospect content assets based on the behavior and viewing patterns of both the users 308 and 310. Thus, the user profile 322 may indicate a content recommendation period with a content recommendation period time of 18:00-19:00 and a content type of local news, and may assign this content recommendation period based on the current time. But the local office 103 also recognizes the user 310 and may weight content items differently than if the user 310 was not detected. Thus, the local office 103 may determine that the user 310 tends to primarily watch a sitcom from 18:00-19:00, and then may next tend to watch a sports program from 18:00-19:00 (e.g., the user 310 tends to watch a sitcom 75% of the time from 18:00-19:00, tends to watch a sports program 20% of the time from 18:00-19:00, and tends to watch other programs the other 5% of the time). The local office 103 may also determine that the user 308 tends to primarily watch the local news from 18:00-19:00, and then may next tend to watch a sports program from 18:00-19:00 (e.g., the user 308 tends to watch the local news 85% of the time from 18:00-19:00, tends to watch a sports program 10% of the time from 18:00-19:00, and tends to watch other programs the other 5% of the time). Thus, determining that each user's second option for watching television between 18:00-19:00 is the same, the local office 103 may provide greater weight to sports program content items, and subsequently, recommend a sports program content item. Additionally, the recommendation may further be refined if the particular sports program one user tended to watch matched the particular sports program the other user tended to watch.

At step 420, the local office 103 may then track and determine a user's viewing patterns and/or behavior associated with the content indication or recommendation made by the local office 103 in step 418. For example, the user 308 may not accept a recommendation/indication prompt from the local office 103, and may actually access other content. In these cases, the local office 103 may transmit additional recommendations/indications of content items which may be weighted less than candidate content item transmitted in an initial or previous recommendation/indication. In another example, the user 308 may accept/select a recommendation/indication prompt for a content asset transmitted by the local office 103, and local office 103 (or some other content provider) may then transmit content that may correspond to the selected content asset (e.g., the selected program, application, etc.). Another example of user behavior may be that the user 308 did not stop accessing a recommended content item until the end of the content recommendation period (e.g., did not turn or switch to other content). Also, the user 308 may continue to watch a content item that runs over the scheduled content recommendation period. Additionally, the local office 103 may determine that the user 308 stopped accessing a content item (e.g., a content item transmitted by local office 103 selected from an indication/recommendation transmitted by local office 103, a content item that client device 302 automatically tuned to based on an indication/recommendation transmitted by local office 103, and the like), and at which point during the playback of a content item the user 308 stopped the playback. Any behavior or viewing pattern of a user may be determined in step 420.

The process 400 may then return to step 404, where the local office 103 may use the information determined and obtained in step 420 to update, determine, gather, and/or analyze historical data (e.g., the historical data 328) for a user (e.g., the user 308). The process 400 may then continue and may use the updated historical data. The process 400 may end after any of the steps in the process 400. Any of the disclosed steps in FIG. 4 may be omitted, be performed in other than the recited order, repeated, and/or combined.

Figure 6:
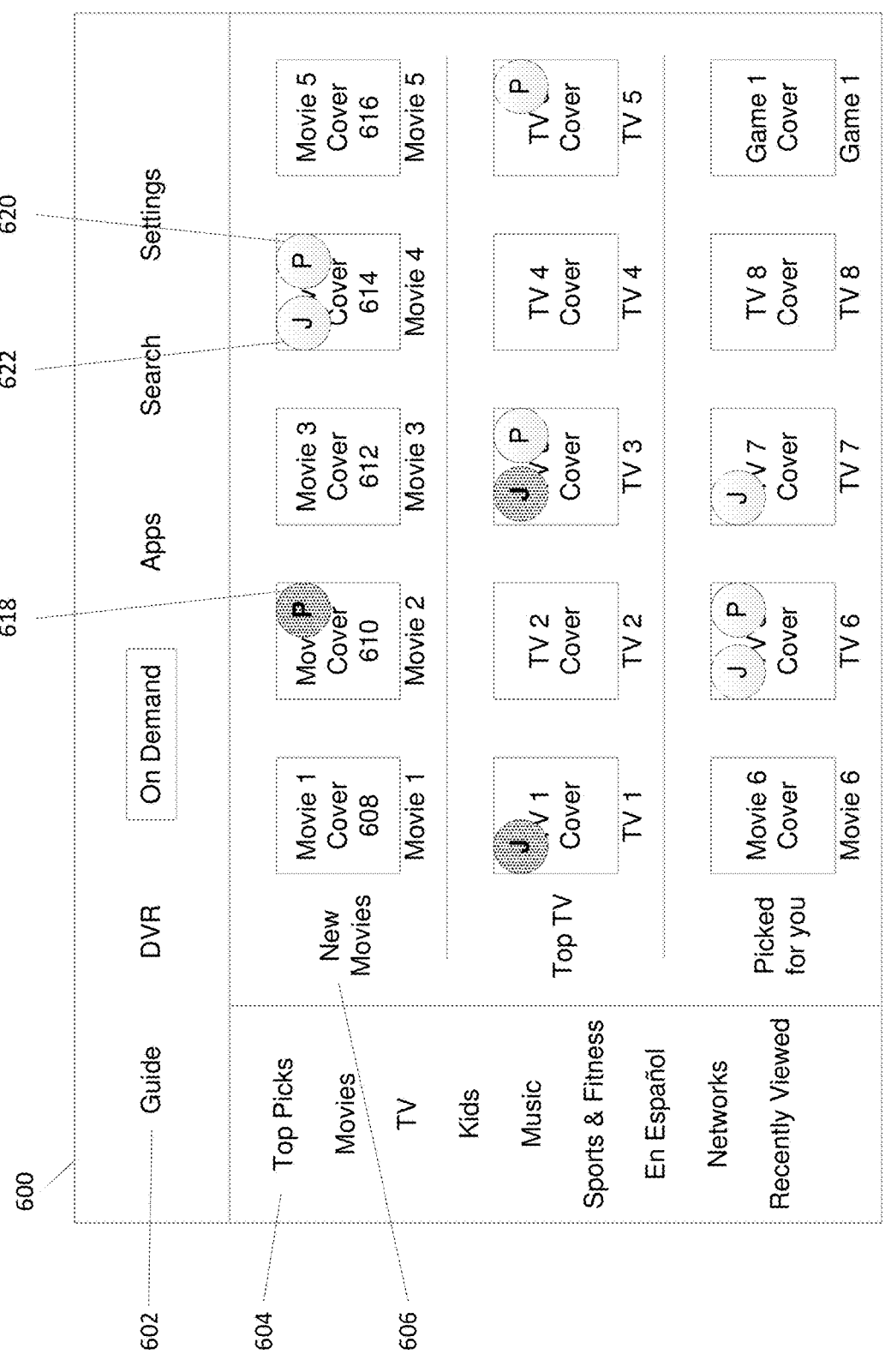
FIG. 6 depicts an illustrative graphical user interface that may be generated for display in accordance with one or more embodiments described herein.

FIG. 6 depicts an illustrative graphical user interface that may be generated for display in accordance with one or more embodiments described herein.

A device may generate for display by a display device an interface (e.g., interface 600). The interface 600 may be generated by a computing device (e.g., a set-top box, computer, television, receiver, etc.), that may be configured to receive signals from a network (e.g., a headend). The computing device may generate the interface 600 for display on a display device (e.g., a television, computer, monitor, smartphone, tablet, handheld device, etc.).

The interface 600 may include one or more features similar to an electronic program guide. For example, the interface 600 may allow one or more users to interact with video, audio, audiovisual, interactive, and other content. For example, using interface 600, a user may be able to select one or more pieces of content to view or listen to (e.g., a movie, television show, video clip, playlist, song, audio track, etc.).

The interface 600 may include different categories of content sources. For example, each category 602 may include "Guide," "DVR," "On Demand," "Apps," Search," "Settings," and the like. The selected category 602 may include an indication that it is selected. In FIG. 6, for example, "On Demand" is selected, as indicated by a box around "On Demand."

Each category 602 may correspond to a different source of content. For example, selecting "Guide" may cause display of an electronic program guide, which may display listings for live television or broadcast content that may be available. Selecting "DVR" may cause display of a listing of content recorded on a DVR. Selecting "On Demand" may cause display of a listing of content available to be viewed on demand. For example, content may be available on a content server (e.g., content server 106), and may be streamed on demand to a client device (e.g., set-top box 113). Selecting "Apps" may cause display of a listing of apps available to be used on the device, apps available to be installed on the device, or the like. Selecting "Search" may cause display of a search screen, which may allow for content to be searched. Selecting "Settings" may cause display of a screen that allows settings of the guide (e.g., interface 600) to be adjusted, settings of the device, settings of a user profile associated with an account of the user (e.g., an account with a television service provider, internet service provider, etc.).

The interface 600 may include display of different genres of content. For example, each genre 604 may correspond to a different genre. For example, genres 604 may include "Top Picks," "Movies," "TV," "Kids," "Music," "Sports & Fitness," "En Español," "Networks," "Recently Viewed," and the like.

The interface 600 may include display of specific content, which may be organized into different subsections. For example, portion 606 of the interface 600 may include sections for displaying content listings, the sections including "New Movies," "Top TV," and "Picked for you," and the like. Each section may include one or more graphics associated with a particular piece of content. For example, "New Movies" may include one or more images (e.g., movie poster, box cover, screenshot, etc.), each uniquely associated with a movie. For example, FIG. 6 includes a display of, under "New Movies," Movie 1 Cover 608, Movie 2 Cover 610, Movie 3 Cover 612, Movie 4 Cover 614, and Movie 5 Cover 616.

The interface 600 may include an indication (e.g., indicator 618, indicator 620, indicator 622) that may correspond to a user's interaction with a piece of content. The indication may include a graphic, text, a shape, a color, a status bar, an icon, an alteration of the content graphic, or the like. The indicator may be overlaid, placed next to, or otherwise associated with a particular graphic associated with a particular piece of content. Thus, the indicator may indicate a user's interaction with that piece of content.

The indication may indicate a user's interaction with a piece of content. For example, the indicator may indicate whether a user has viewed a piece of content or not. For example, indicator 618 may be overlaid over Movie 2 Cover 610, and therefore may indicate whether a user has viewed Movie 2. In another example, indicator 620 may be overlaid over Movie 4 Cover 614, and therefore may indicate whether a user has viewed Movie 4. An indicator may be different based on the user's interaction with the piece of content. For example, indicator 618 may be a color that indicates that the user has watched Movie 2, while indicator 620 may be a different color that indicates that the user has not watched Movie 4. In another embodiment, the indicator may include a different icon or graphic, shade, design, pattern, outline, font, text, or the like based on the user's interaction with the content.

Figure 7B:
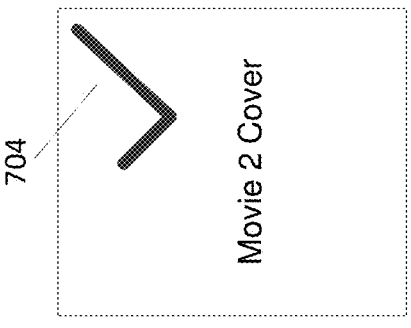
FIGS. 7A-B illustrate various additional examples of indications that may be displayed with a graphic associated with a piece of content.
Figure 7B:
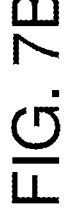
Figure 7A:
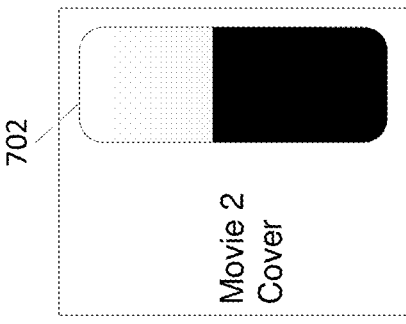

For example, FIGS. 7A-B illustrate various additional examples of indications that may be displayed with a graphic associated with a piece of content. For example, FIG. 7A depicts an indication (e.g., indicator 702) that may show how much of the piece of content a user may have viewed. For example, a user may have viewed part of a piece of content (e.g., 15 minutes out of 25 minutes). The indicator 702 may depict a status bar that corresponds to the percentage of the content that the user has viewed. For example, the indicator 702 may depict a status bar that is 60% completed to correspond to the user having viewed 15 minutes of a 25-minute piece of content.

In another example, one embodiment of which is depicted in FIG. 7B, the indication may be a different graphic or shape based on whether a user has viewed a piece of content. For example, indicator 704 may be a check mark, which may indicate that the user has viewed the piece of content. In another example, the indicator may include an "X" to indicate that the user has not viewed a piece of content. In other examples, the indicator may be one or more additional shapes, colors, graphics, icons, text, etc., to indicate one or more different interactions or relationships between a user and the piece of content.

Returning to FIG. 6, the indication may be associated with a particular user. For example, indication 618 and indication 620 may be associated with a first user (e.g., a user named Pam), and indication 622 may be associated with a second user (e.g., a user named Jim). The indication may be unique based on the user associated with the indication. For example, the indication may include a unique graphic, color, logo, text, letter, icon, symbol, avatar, etc., uniquely associated with the user. For example, indication 618 may letter "J" to represent the user "Jim."

An indication may be displayed for each piece of content associated with each user. Some content may be associated with one user, some other content may be associated with more than one user, and some other content might not be associated with a user. For example, as depicted in FIG. 6, the interface 600 may include indication 620 for user Pam with regard to Movie 4, and the interface 600 may include indication 622 for user Jim with regard to Movie 4.

A user may be associated with one piece of content, a user may be associated with more than one piece of content, or a user might not be associated with any piece of content. For example, a user Pam may be associated with (e.g., interested in) Movie 2, as indicated by indication 618; Movie 4, as indicated by indication 620; TV 3, as indicated by indication 628; TV 5, as indicated by indication 630; and TV 6, as indicated by indication 634.

An indication may be displayed based on one or more factors. Illustrative factors are discussed in more detail below. The determination for whether to display an indicator or not may be based a consideration of one or more factors. Some factors may be weighted more heavily than others, or multiple factors may be given the same weight. Indications based on different factors may be displayed differently. For example, if a user has not viewed a new episode of show that the user has indicated the user wants to regularly watch, a first "unwatched" indicator may be displayed. If the user has not viewed a new episode of a show that the system predicts the user may enjoy (e.g., based on viewing history, user interests, viewing histories of user's friends, etc.), a second "unwatched" icon may be indicator. Thus, different indicators may be displayed depending on the criteria used for determining the user's interest or potential interest in a program.

An indication may be displayed based on a user's viewing history. For example, if a user consistently views a particular program, an indicator may be displayed for each episode of the program that the user has viewed. If a user has not viewed a particular episode of a program (e.g., the user did not view all the episodes in order, the user skipped some episodes, one or more new episodes have not been viewed by the user, etc.), an indication may be displayed that indicates that the user has not viewed the program.

An indication may be displayed based on a prediction that a user may enjoy a program. A prediction may be based on a user's viewing history, interests, social-media profile (e.g., likes), viewing histories or interests of friends or family of the user, and the like. For example, a user may enjoy watching romantic comedies. If the guide is displaying images associated with newly-released movies, some of which include romantic comedies, an indicator may be displayed that indicates that the user has not viewed one or more of the newly-released romantic comedies.

An indication may be displayed based on another user's viewing history. For example, the system may determine that a first user often watches a particular program with a second user. If the first user has viewed an episode of the particular program, but the second user has not viewed the episode of the particular program, an indicator may be displayed that the first user has viewed the episode of the particular program, and a second indicator may be displayed that the second user has not viewed the episode of the particular program.

Thus, an indicator of whether a particular user has viewed a particular piece of content may be tied to the content itself, rather than a particular recording of that content. For example, a user may view a movie or television show using an online streaming source. When the user views an electronic program guide through a set-top box connected to the user's television, the electronic program guide may display an indicator that the user has viewed that movie or television show, even if the user did not view the movie or television show using the content provider associated with the set-top box. Thus, a user may have a unified content-viewing and tracking experience.

As an additional example, a user may view a movie in a movie theater. There may exist one or more methods for determining that the user viewed the movie in the movie theater. For example, the user may have a movie-theater rewards account, use a check-in app on the user's smartphone to check-in or indicate using social media that the user is viewing the movie, the user's purchase history using a credit card or bank account may indicate that the user purchased tickets to the movie, the user may have purchased tickets to the movie online using an online ticket vendor, the user's smartphone may have an app that listens to the ambient noise using the smartphone's microphone and determines that the user is viewing the movie, and the like. Thus, there are many methods for determining that a user is viewing or has viewed a movie in the movie theater. The user may have an account with a service provider that is linked with one or more accounts that determines or contains data that may be used to determine that the user has viewed a movie at the movie theater. For example, the user may associate the user's service-provider account with the user's movie-ticket-purchasing account, which may allow the user's service-provider account to determine when the user has purchased tickets to view a particular movie. After the user has viewed the particular movie, an electronic program guide associated with the user's service-provider account may display an indicator over a graphic associated with the particular movie that indicates that the user has viewed the particular movie.

An indicator may include information about the user's viewing history or viewing interaction with the content. For example, the indicator may include a date that the user viewed the content, or if the user has viewed the content multiple times, the indicator may include one or more dates that the user viewed the content (e.g., the first time the user viewed the content, the most recent time the user viewed the content, one or more times the user viewed the content with a particular other user, etc.). A pop-up menu may appear to show additional information about the user's viewing history or interaction with the content (e.g., showing listings of dates that the user has watched the content, who the user has watched the content with, a place that the user watched the content, a device that the user watched the content using, if the content is part of a series, which other content in the series the user has watched, the next time the content will be available to watch, whether the content is available on demand, the user's rating of the content, via a content-streaming service, etc.).

An interface may perform some functions based on who is currently using the system. In some embodiments, the system may determine who is currently using the system based on a camera that performs facial recognition, microphone that performs voice recognition, a sensor, a connection (e.g., BLUETOOTH connection) to a device uniquely associated with a user (e.g., a smartphone), etc. For example, the system may display indicators based on one or more criteria related to who is viewing the guide. For example, the system may display indicators for only the users currently viewing the guide. In another example, the system may display indicators for a user currently viewing the guide and for other users with whom the user currently viewing the guide regularly watches content. For example, if a person regularly watches a particular show with a spouse, but does not watch a different show with the spouse, the person viewing the guide without the spouse may see indicators for the person and spouse for the particular show that the person watches with the spouse, but not for the different show that the person does not watch with the spouse.

Figure 8:
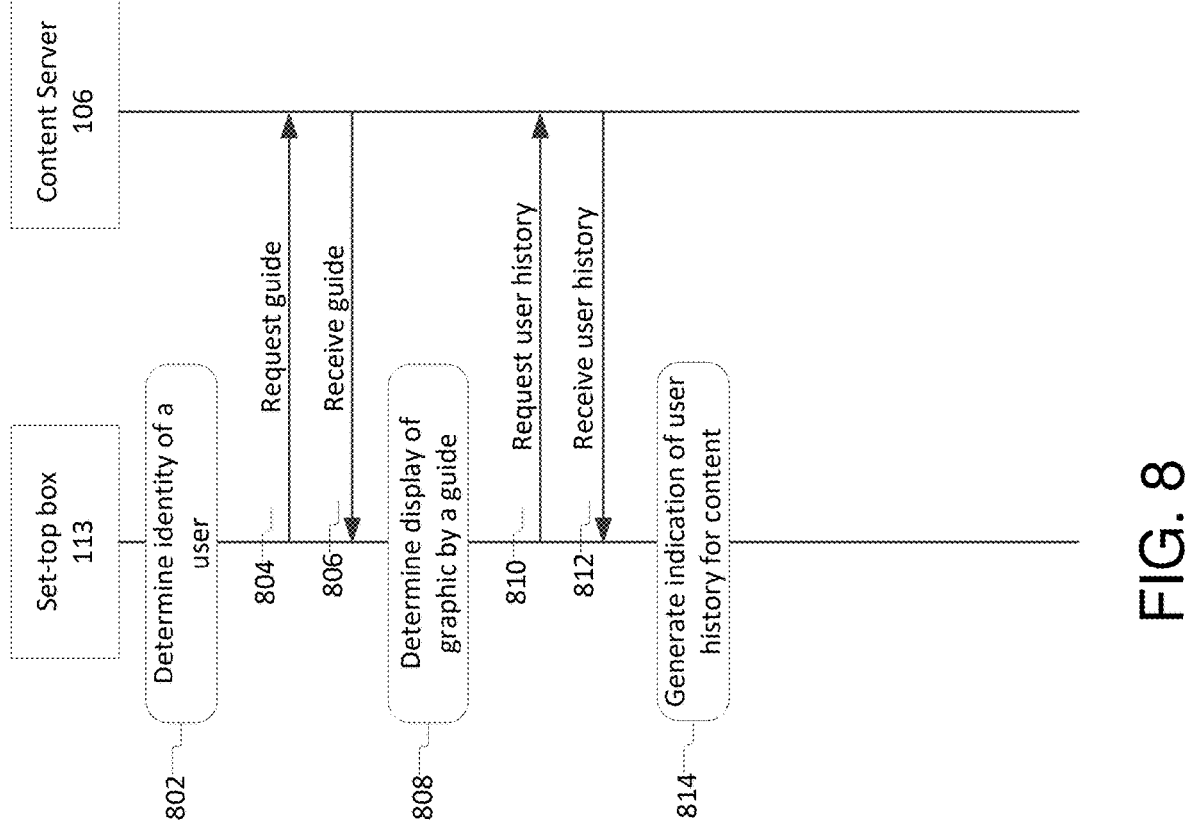
FIG. 8 depicts an illustrative flow diagram of the interactions between devices in a system configured to operate in accordance with features described herein.

FIG. 8 depicts an illustrative flow diagram of the interactions between devices in a system configured to operate in accordance with features described herein. Depicted are interactions between set-top box 113 and content server 106. Alternatively or additionally, the functions depicted as being performed by set-top box 113 may be performed by one or more additional or different computing devices, such as another set-top box, a DVR, a laptop, tablet, desktop, smartphone, or the like. Alternatively or additionally, the functions depicted as being performed by content server 106 may be performed by one or more additional computing devices, servers, or the like.

In step 802, set-top box 113 determines an identity of a user. For example, set-top box 113 may use a camera, voice recognition, biometric identification (e.g., fingerprint recognition, retina scan), a login (e.g., a user profile), or the like to identify a user of the set-top box. There may be one user or more than one user. The set-top box 113 may determine an identity of one user or more than user. The set-top box 113 might not determine the identity of every user. For example, if a group of people are all watching television connected to set-top box 113, the set-top box 113 may determine the identity of the members of the group who have user profiles on the set-top box 113 (e.g., those people that live at the home where the television is located), while the set-top box 113 might not determine the identity of the members of the group who do not have user profiles on the set-top box 113.

In step 804, the set-top box 113 may request guide information from the content server 106. The request for guide information may include identity information for one or more users currently using the set-top box. Alternatively or additionally, the request for guide information may include information for a user account associated with the set-top box 113. The user account may have one or more individual user profiles associate with the user account. The request for guide information may include identification of every user profile associated with the set-top box.

In step 806, the set-top box 113 may receive guide information from the content server 106. For example, the set-top box 113 may receive a message including guide information. The message may also include information regarding one or more users associated with a user account associated with the set-top box 113. The set-top box 113 may generate for display the received guide information.

In step 808, the set-top box 113 may determine display of a graphic associated with a piece of content by a guide. For example, the guide may display a graphic to indicate the availability of content to be viewed. A guide may include one or more graphics or other indicators associated with content. For example, a guide may display one or more movie posters, tv-show graphics, thumbnail images, text, or another type of indicator of a show, movie, song, clip, or other content.

In some embodiments, the set-top box 113 may in step 810 request user history. A request for the user history may include user profile information, viewing history, and the like. In some embodiments, the set-top box 113 may request the user history in step 804 with the guide information. The user history may be a viewing history for one or more pieces of content viewed by one or more users associated with the set-top box 113. The viewing history may include an individualized viewing history for one or more of the users associated with the set-top box 113.

In some embodiments, the set-top box 113 may store the user history locally. In other embodiments, the user history may be stored remotely from the set-top box 113 (e.g., on a server, computing device, cloud database, etc.). The set-top box 113 may sync a local version of the user history with a version stored remotely (e.g., on a cloud).

In step 812, the set-top box 113 may receive the user history. In some embodiments, the set-top box 113 may receive the user history in step 806 with the guide information.

In step 814, the set-top box 113 may generate an indication of user history for content. For example, the set-top box 113 may generate an indicator of whether a user has viewed content or not. A guide that includes a graphic associated with the content may include an indicator that indicates whether a user has viewed content or not. The guide may include one or more indicators for one piece of content, and may include indicators for one or more pieces of content. The guide might not include an indicator for every piece of content, and every piece of content might not include an indicator for every user associated with the set-top box 113.

Figure 9:
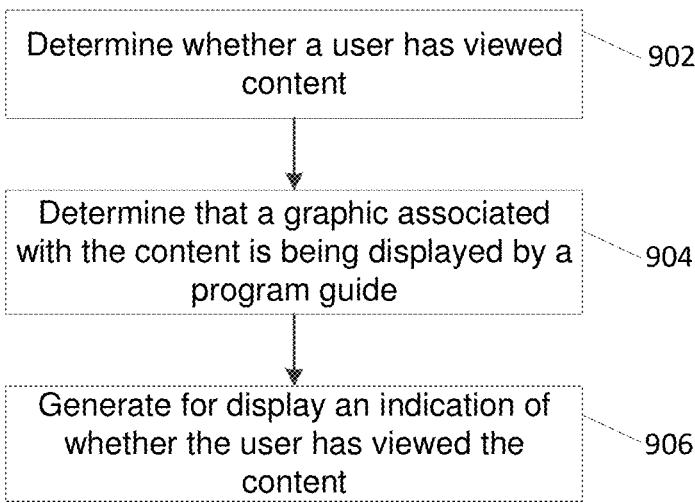
FIG. 9 depicts an illustrative flow diagram of an algorithm for determining whether to display an indicator with a program guide.

FIG. 9 depicts an illustrative flow diagram of an algorithm for determining whether to display an indicator with a program guide. In step 902, a system may determine whether a user has viewed content. For example, the system may retrieve a viewing history associated with a profile, a device, an identity, or the like.

The viewing history may be stored in a database or table that includes a listing of a plurality of program identifiers and viewing times for each identified program. A viewing history may be uniquely associated with a viewing profile. Alternatively or additionally, a device may be uniquely associated with a viewing history, which may include an identification of each user that viewed each program in the history.

In step 904, the system may determine that a graphic associated with content is being displayed by a guide. For example, a guide may include a plurality of graphics that each represent particular content. The guide may include more programs than are being displayed on a display (e.g., a television) at a particular time. The system may determine whether a portion of the guide including a graphic associated with the particular content is being displayed by the display at a given time.

Alternatively or additionally, the system may determine whether a portion of the guide including the graphic associated with the particular content is close to being displayed. For example, if a user is scrolling through a list of programs, and the particular content is within a threshold number of programs of being displayed, then the system may determine that the particular content is close to being displayed.

In step 906, the system may generate for display an indication of whether the user has viewed the content. The system may display any combination of different indications of whether one or more users have viewed particular content. For example, in some embodiments, the system may generate the indication if the graphic associated with the program is being displayed, or is close to being displayed. Thus, in some embodiments, the system may conserve processing power by only generating the indication if the graphic associated with the program is being displayed or is close to being displayed.

Alternatively, in some other embodiments, the system may always generate the indication of whether the user has viewed particular content. For example, the system may receive guide information, and may generate an indication of user viewing history for every program in the guide listing. In another example, the system may generate an indication of user viewing history for every program that the user has viewed. In a further example, the system may generate an indication for every program that the user has viewed, every program the user is interested in, every program the user may be interested in, and the like.

Thus, many combinations of different indications may be generated for display by the system. The system may determine when to display an indication or when to generate an indication based on a set of preferences. The preferences may be defined by one or more entities, including a system administrator, a service provider, a user, a content provider, and the like.

The system may compare the viewing history with guide information. For example, the system may determine a list of programs identified in the viewing history as having been viewed by one or more users associated with the viewing history. The system may determine a list of programs for each program for which information is included in the guide. The system may compare the list of programs identified in the viewing history as having been viewed with the list of programs for which information is included in the guide. The system may generate one or more indications for one or more of the programs for which information is included in the guide, the one of more indications including indications of whether or not the programs in the guide were viewed by the users associated with the viewing history.

Figure 10:
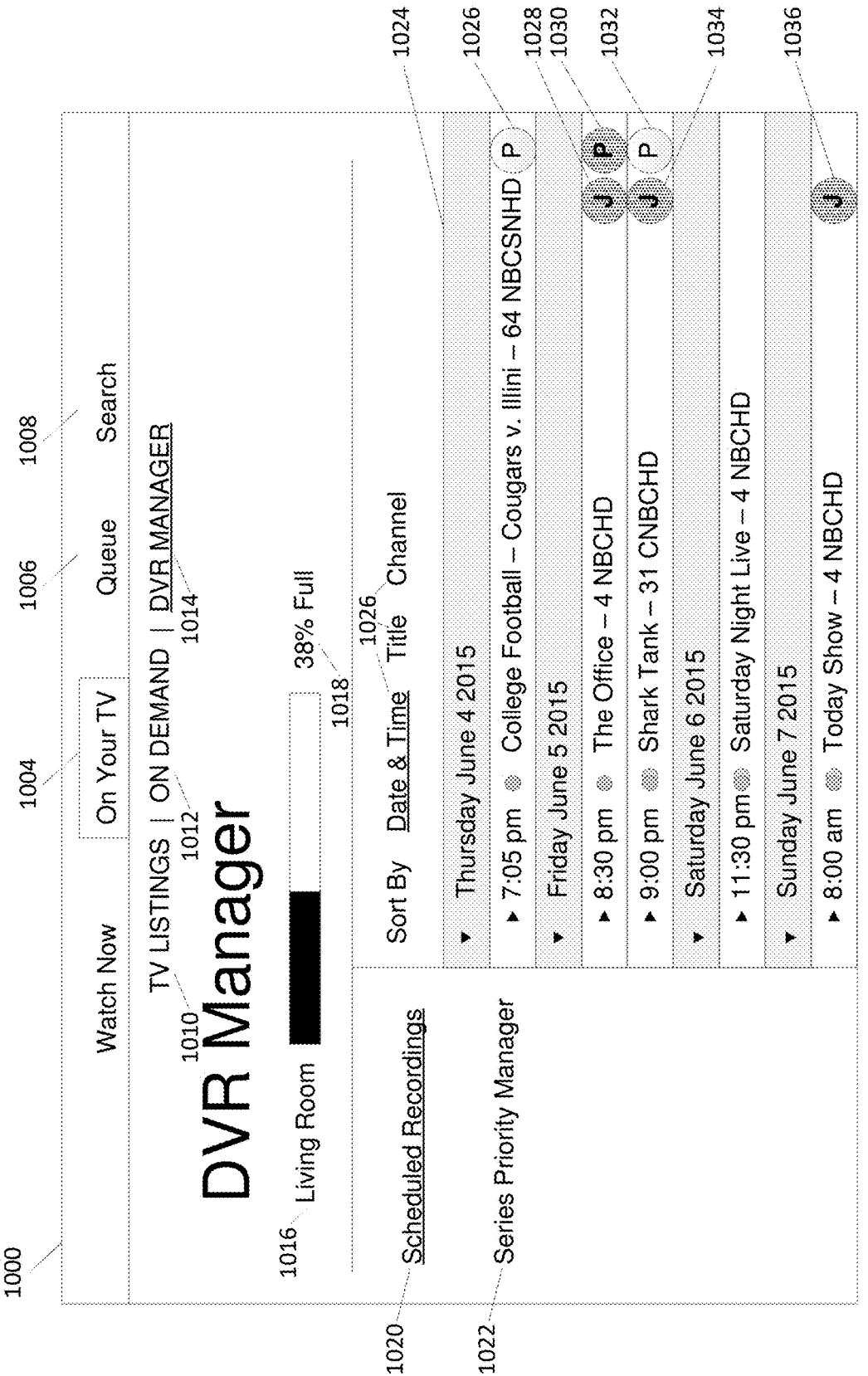
FIG. 10 depicts an illustrative user interface that includes one or more aspects described herein.

FIG. 10 depicts an illustrative user interface that includes one or more aspects described herein. Specifically, FIG. 10 depicts a user interface (e.g., interface 1000) for interacting with a user account, including managing a DVR. The interface may be displayed on a display (e.g., a television, a computer, a mobile phone, a tablet, etc.). The interface may include different elements or formatting based on the type of display (e.g., a first interface for display on a television, and a second interface for display on a mobile device).

The interface 1000 may include one or more navigation tabs (e.g., Watch Now tab 1002, On Your TV tab 1004, Queue tab 1006, Search tab 1008). Each navigation tab may, when selected, cause display on the interface 1000 of a different feature available to a user. A selected tab (e.g., On Your TV tab 1004) may include a visual indicator that the selected tab is selected (e.g., an outline, underline, font, size, color, highlighting, or the like).

Within a particular navigation tab, one or more features may be available for selection. For example, FIG. 10 depicts On Your TV tab 1004, which includes text that may be selected to cause display of different features including TV LISTINGS 1010, ON DEMAND 1012, and DVR MAN-AGER 1014. A selected feature may include a visual indicator that the selected feature is selected (e.g., an outline, underline, font, size, color, highlighting, or the like).

The interface 1000, when showing DVR MANAGER 1014, may include information about one or more DVRs of a user. For example, a user may have one or more DVRs associated with the user's account. The interface 1000 may include an indicator with a nickname 1016 for the DVR, and an indicator 1018 of the amount of space currently available on the DVR.

The interface may include an option 1022 to view a Series Priority Manager. When the option 1022 to view the Series Priority Manager is selected (not depicted), the interface 1000 may include a listing of options for managing priority of recordings. For example, a user account associated with the DVR may have multiple scheduled recordings. The DVR may record content based on those scheduled recordings. The DVR may include one or more tuners. There may sometimes be a conflict between two or more scheduled recordings. For some conflicts (e.g., time-based conflicts), if the DVR has multiple tuners, the DVR may record both scheduled recordings. But if there are more scheduled recordings than available tuners at a particular time, the DVR may have to resolve the scheduling conflicts. Similarly, other conflicts may arise based on insufficient space for recording on the DVR, insufficient privileges for recording, or another conflict that the system may resolve.

The scheduling conflicts may be resolved based on priority. The DVR may determine priority based on one or more factors. For example, factors may include user identity, source of content, number of users interested in content, number of users who have viewed the content, amount of DVR space used by each user, amount of content time recorded by each user, percentage of recorded content viewed by each user, or the like. For example, a DVR may determine that if three users are interested in viewing a first content, while only two users are interested in viewing a second content, then the DVR may prioritize recording the first content over recording the second content. In another example, the DVR may prioritize a particular user. For example, if a parent is interested in viewing content, the DVR may prioritize the parent's content over a child's content, even if there are multiple children interested in viewing the child's content. In another In another example, the DVR may prioritize recording of content based on the user who most often uses that particular DVR. For example, if a home has multiple DVRs (e.g., one in the living room, one in the parents' room, and one in the child's room), the DVR in the child's room may prioritize recordings of content that the child is interested in, while the DVR in the parents' room may prioritize recordings of content that the parents are interested in. In another example, the DVR may allocate a percentage of space to each user. If a particular user has used all the space allocated to that particular user, while a different user has not used all the space allocated to the different user, the DVR may prioritize a recording for the different user until the different user has used all the different user's space or until the particular user frees some of the space allocated to the particular user. Thus, many different algorithms or combinations of factors may be used for determining recording priority. The above-described examples are non-limiting, and are merely illustrative of the many different methods by which a system may determine recording priority. The interface 1000, after Series Priority Manager 1022 is selected, may display one or more options or interface components to allow a user to configure recording priority for one or more DVRs.

The interface 1000 may include an option 1020 to view Scheduled Recordings. When the option 1020 to view Schedule Recordings is selected, the interface 1000 may include a listing of recordings 1024 scheduled on the DVR identified by the nickname 1016. The recordings may be sorted by one or more sort options 1026 (e.g., date and time, title, channel).

The listing of recordings 1024 may include one or more dates, which may be in the past, present, or future. Each date may include one or more recordings for that date. Each date may be expandable or collapsible to reveal or hide one or more recordings for that date. The display may differ based on the selected sort option 1026. For example, the interface may include expandable or collapsible boxes to reveal or hide one or more recordings for a particular title when sorting by title, for a particular channel when sorting by channel, or the like.

The listing of recordings 1024 may include details about one or more recordings that may have occurred or that may be scheduled to occur on the DVR being managed (e.g., the DVR identified by the nickname 1016). For example, as depicted in FIG. 10, a DVR recording may have occurred or be scheduled to occur on Jun. 4, 2015, at 7:05 PM, for a College Football game on channel 64 NBCSNHD between the Cougars and the Illini. As depicted in FIG. 10, a DVR recording may have occurred or be scheduled to occur on Jun. 5, 2015, at 8:30 PM, for an episode of The Office on channel 4 NBCHD, and at 9:00 PM for an episode of Shark Tank on channel 31 CNBCHD. As depicted in FIG. 10, a DVR recording may have occurred or be scheduled to occur on Jun. 6, 2015, at 11:30 PM, for an episode of Saturday Night Live on channel 4 NBCHD. As depicted in FIG. 10, a DVR recording may have occurred or be scheduled to occur on Jun. 7, 2015, at 8:00 AM, for the Today Show on channel 4 NBCHD. The DVR may record one or more shows at the same time, on different channels, using different tuners.

The interface may include an indicator for whether a show is part of a regularly-scheduled recording, or whether the recording was scheduled independent of a regularly scheduled recording. For example, as depicted in FIG. 10, Shark Tank, Saturday Night Light, and the Today Show may be regularly-scheduled recordings, as indicated by the multiple overlapping circles between the time and the name of the show. By contrast, College Football and The Office may be recordings scheduled independent of a regularly scheduled recording, as indicated by the single circles between the time and the name of the show. There may be other ways to indicate whether a show is part of a regularly scheduled recording (e.g., text, icons, shapes, colors, etc.).

The interface 1000 may include one or more indicators of whether a user has viewed or may be interested in viewing a particular show that was recorded or is scheduled to be recorded. Different indicators may have different appearances. For example, different indicators may be associated with different users, and there may be more than one appearance for indicators associated with a particular user. For example, a first indicator uniquely associated with a first user may have a first appearance indicating that the first user has not viewed first content. A second indicator uniquely associated with the first user may have a second appearance indicating that the first user has viewed the first content. The first indicator and the second indicator may, however, have similarities that indicate that both the first indicator and the second indicator are associated with the first user. For example, indicators 1030 and 1032 may both be associated with a particular user Pam. The indicator 1030 may indicate that the user Pam has viewed a program, and the indicator 1032 may indicate that the user Pam has not viewed a program.

Some indicators may indicate that a user has viewed a program. For example, indicators 1028, 1030, 1034, and 1036 may indicate that the program has already been viewed by the users associated with the respective indicators. Specifically, the indicator 1028 may indicate that a user Jim has viewed the episode of The Office next to which the indicator 1028 appears. The indicator 1030 may indicate that the user Pam has viewed the episode of The Office next to which the indicator 1030 appears. The indicator 1034 may indicate that the user Jim has viewed the episode of Shark Tank next to which the indicator 1034 appears. The indicator 1036 may indicate that the user Jim has viewed the episode of the Today Show next to which the indicator 1036 appears.

Some indicators may indicate that a user has not viewed a program. For example, the indicator 1026 may indicate that the user Pam has not viewed the College Football game next to which the indicator 1026 appears. The indicator 1032 may indicate that the user Pam has not viewed the episode of Shark Tank next to which the indicator 1032 appears.

If a user is not interested in viewing content, there may not be an indicator for that user next to that content. For example, the user Jim may not be interested in football, college football, the teams the Cougars or the Illini, or the particular matchup between the Cougars and the Illini. Therefore, the interface 1000 might not include an indicator uniquely associated with the user Jim next to the listing for College Football-Cougars v. Illini. By contrast, the user Pam may be interested in football, college football, the teams the Cougars or the Illini, or the particular matchup between the Cougars and the Illini. The user Pam may have indicated that she is interested in viewing the content, or the system may have predicted that Pam may be interested in viewing the content. Therefore, the interface 1000 may include an indicator 1026 uniquely associated with the user Pam next to the listing for College Football-Cougars v. Illini.

Figure 11:
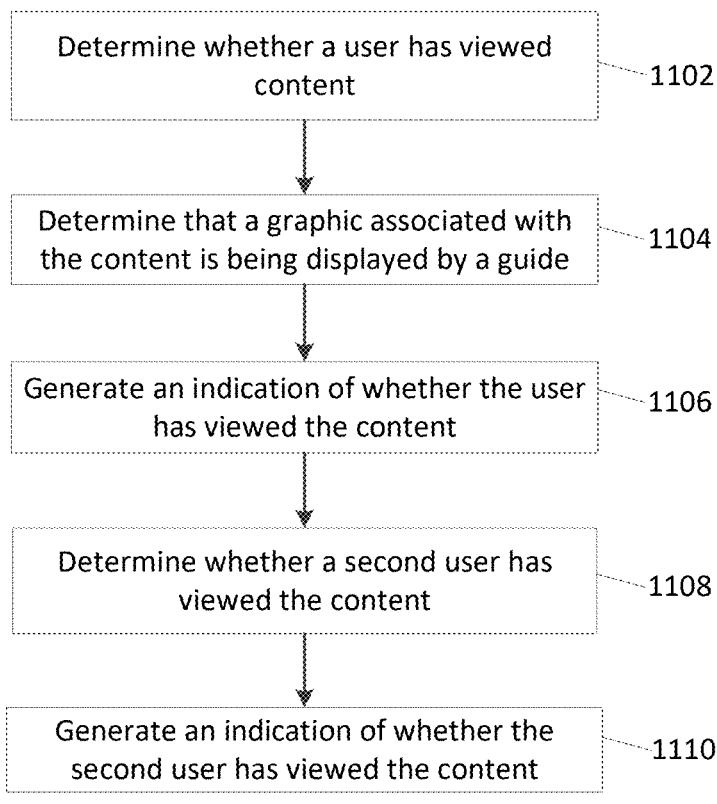
FIG. 11 illustrates a flow diagram of an illustrative method for generating a display for user viewing of content.

FIG. 11 illustrates a flow diagram of an illustrative method for generating a display for user viewing of content. In step 1102, the system may determine whether a user has viewed content. For example, the system may receive information associated with the user (e.g., viewing history, social media account, content-viewing account, etc.). Based on the information associated with the user, the system may determine whether the user has viewed the content.

In step 1104, the system may determine that a graphic associated with the content is being displayed by a guide. For example, an electronic program guide may display a grid or list with one or more graphics or text, the graphics or text representative of one or more pieces of content. While the guide may allow a user to access a library of content (e.g., a video-on-demand library), at any given time, the guide may only display graphics or indicators associated with a subset of that content. The system may determine the subset of content for which graphics or indicators are being displayed.

In step 1106, the system may generate an indication of whether the user has viewed the content. For example, the system may compare one or more determinations of whether the user has viewed content with one or more identifiers of content for which graphics or text are being displayed by the guide. Based on the determination, the system may generate for display one or more indicators that the user has viewed one or more content for which graphics or text are being displayed by the guide.

Additionally, the system may determine whether a user is interested in viewing the content. If the user has not viewed the content, the system may generate an indication that the user has not viewed the content, but that the user may be interested in viewing the content. The indicator indicating that the user has not viewed the content may be different than the indicator indicating that the user has viewed the content.

In step 1108, the system may determine whether a second user has viewed the content. For example, the system may receive information about the second user, and use the information about the second user to determine content viewed by the second user.

In step 1110, the system may generate an indication of whether the second user has viewed the content. For example, the system may compare the content determined in step 1108 as having been viewed by the second user with content for which graphics or text are currently being displayed, and generate indicators that the second user has viewed one or more particular pieces of content for which graphics or text are currently being displayed. Additionally, the system may determine one or more pieces of content that the second user may be interested in viewing, and generate one or more indicators that the user has not viewed but may be interested in viewing content for which graphics or text are currently being displayed.

Figure 12:
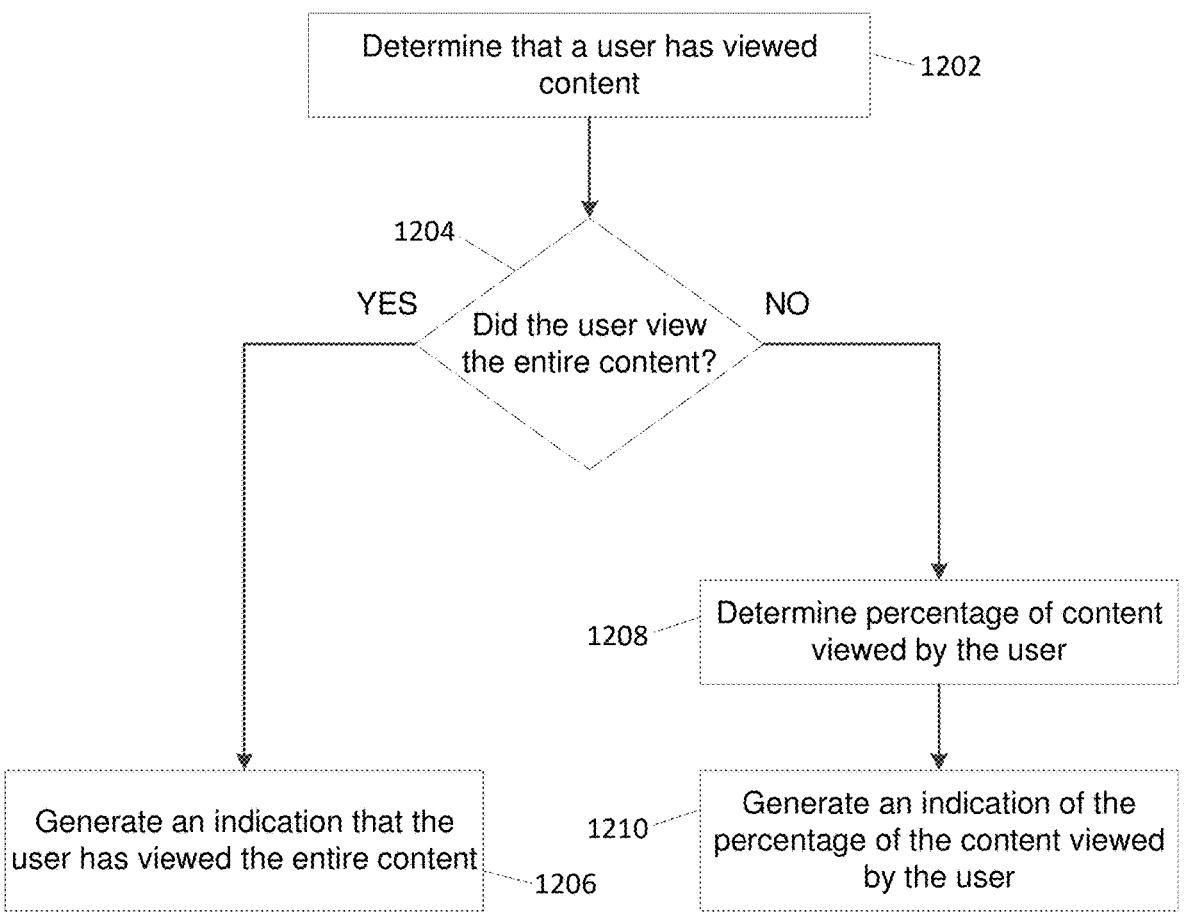
FIG. 12 illustrates a flow diagram of an illustrative method for generating a display for user viewing of content.

FIG. 12 illustrates a flow diagram of an illustrative method for generating a display for user viewing of content. In step 1202, the system may determine that a user has viewed content. For example, the system may receive information about the user (e.g., a user viewing history, user profile, etc.) that includes information about whether a user has viewed content.

In step 1204, the system may determine whether the user viewed the entire content. For example, the information received in step 1202 may include information that includes or may be used to determine whether a user viewed the entire content. For example, the information may include an amount of time that the user viewed the content, a point in the content at which the user stopped viewing the content, one or more milestones in the content viewed by the user, a percentage of the content that the user viewed, or the like. If the percentage of the content that the user viewed is above a threshold, the system may determine that the user viewed the entire content. In another example, each piece of content identified in a viewing history may include a flag that indicates whether the user has viewed the entire content. If the flag is set to indicate that the user viewed the entire content, the system may determine that the user viewed the entire content.

If the system determines that the user viewed the entire content, then the system may perform step 1206. In step 1206, the system may generate an indication that the user has viewed the entire content. For example, the system may generate an indicator that shows that the user has completed viewing the content. The indicator may be displayed with a graphic associated with the content.

Returning to step 1204, if the system determines that the user did not view the entire content, then the system may perform step 1208. In step 1208, the system may determine the percentage of content viewed by the user. For example, the user may have viewed 88 minutes of a 92-minute movie (e.g., the user turned off the movie once the closing credits began). The system may divide the amount of time the user viewed the content by the total amount of time of the content. For example, the system may determine that because the user viewed 44 minutes of a 92-minute movie, the user viewed 47.8% of the movie. The system may round the percentages if the percentages are above a certain threshold or below a different threshold. For example, if the user viewed 1 minute of a 100-minute movie (e.g., 1%), the system may determine that the user has viewed 1% of the content, but may round down to determine that the user has not viewed the content. In another example, if the user has viewed 97 minutes of a 100-minute movie, the system may determine that the user has viewed the entire movie, rather than only 97% of the movie.

In step 1210, the system may generate an indication of the percentage of the content viewed by the user. For example, the system may generate an indicator similar to indicator 702 illustrated in FIG. 7A. The indicator 702 may include an icon corresponding to the percentage of content viewed by the user. For example, if the user has viewed 40% of content, 40% of the indicator may include one color, while the other 60% of the indicator may include a different color. Thus, the system may allow a user to easily identify partially-viewed content when the indicator is displayed on a guide with graphics associated with the content.

Figure 13:
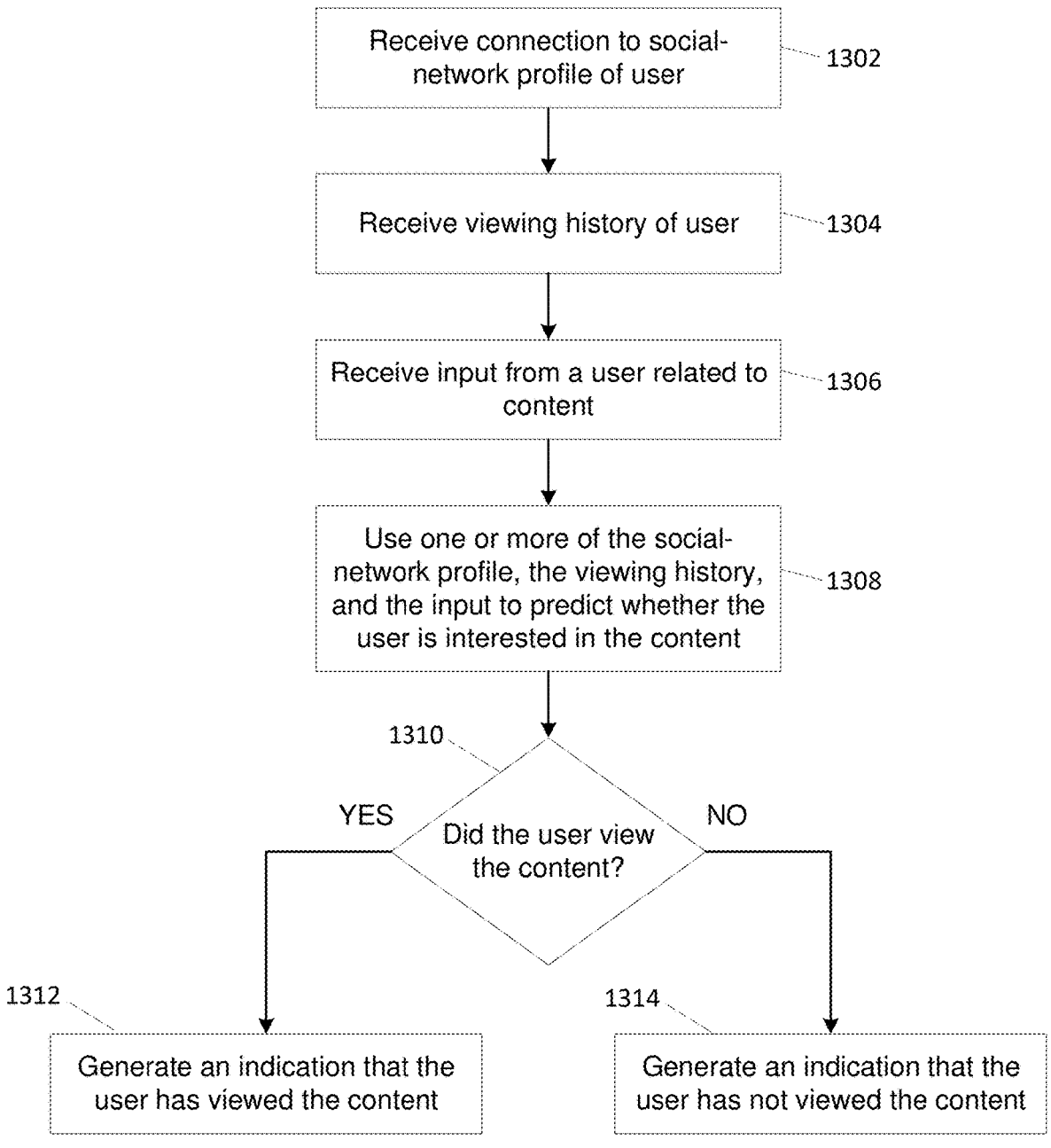
FIG. 13 illustrates a flow diagram of an illustrative method for generating a display for user viewing of content.

FIG. 13 illustrates a flow diagram of an illustrative method for generating a display for user viewing of content. In step 1302, the system may receive a connection to a social-network profile of a user. For example, a user may have a user account with a service provider. The user may use a set-top box, computer, web site, phone, tablet, or other device to login to the user's account with the service provider. The account with the service provider may have the option to link one or more social-network profiles of the user with the user's account with the service provider.

Alternatively or additionally, the user may connect one or more additional accounts of the user with the user's account with the service provider. For example, the user may link an online shopping account, an online movie-ticket-purchasing account, a bank account, a credit card account, a phone account, a content-streaming account, or the like with the user account with the service provider. The various linked accounts may share information. The information sharing may be one-way (e.g., the account with the service provider only receives information), or the information sharing may be two-way (e.g., the account with the service provider both provides and receives information).

In step 1304, the system may receive a viewing history of a user. For example, the system may receive a viewing history of the user based on the viewing activity of the user with a service provider. The system may alternatively or additionally receive viewing activity of the user with one or more other accounts (e.g., a content-streaming account, a movie-ticket-purchasing account, etc.).

In step 1306, the system may receive input from the user related to content. For example, the user may indicate that the user is interested in viewing the content, recording the content, saving the content, purchasing the content, not purchasing the content, sharing the content, not viewing the content, deleting the content, or another type of input related to the content.

In step 1308, the system may use one or more of the social-network profile, the viewing history, and the input from the user to predict whether the user is interested in the content. For example, the user may indicate on a social-network profile of the user that the user likes football. The user may regularly post about a particular football team on a social-network profile. The user may purchase tickets to one or more games per season for the particular football team. The user may purchase apparel or gear for the particular football team using an online store. The user may regularly watch or record football games in which the particular football team is playing. The user may have friends that engage in one or more of these activities (e.g., posting about the particular team, attending games, purchasing apparel or gear, watching games, etc.). Based on one or more of these factors, the system may determine that the user may be interested in viewing an upcoming game in which the particular football team is playing.

In step 1310, the system may determine whether the user has viewed the content. For example, if the upcoming game has not happened yet, the user may not have viewed the content. Alternatively, the system may have recorded the game, but the user may not have viewed the recording. Or the user may have viewed the game live in person, at a friend's house, on a mobile device, or otherwise. The system may use information from multiple different sources to determine whether the user viewed the game. In some aspects, the system may prompt the user whether the user viewed the game. For example, if the system determines that the user's location as determined by the user's smartphone was at the particular football team's stadium for several hours during the time that the game was scheduled to occur, the system may prompt the user with a question, "It looks like you were at the game. Is this correct?" Based on the user's response, the system may save information indicating whether the user viewed the game.

If the system determines that the user has viewed the content, the system may perform step 1312, where the system may generate an indication that the user has viewed the content. For example, the system may generate an indicator (e.g., an icon, graphic, text) uniquely associated with the user that indicates that the user has viewed the content.

If the system determines that the user has not viewed the content, the system may perform step 1314, where the system may generate an indicator (e.g., an icon, graphic, text) uniquely associated with the user that indicates that the user has not viewed the content. For example, the system may generate an indicator that the user may be interested in viewing the particular game. Alternatively or additionally, the system may automatically set the game to record, the system may protect the recording from being deleted until the user has viewed the game, and the like. The system may ask the user if the user is interested in viewing the particular game before recording the game, or the system may automatically record the game based on the one or more factors. The system may receive input from the user that overrides the automatic determination for whether to display the indicator, whether to record the game, and the like.

Figure 14:
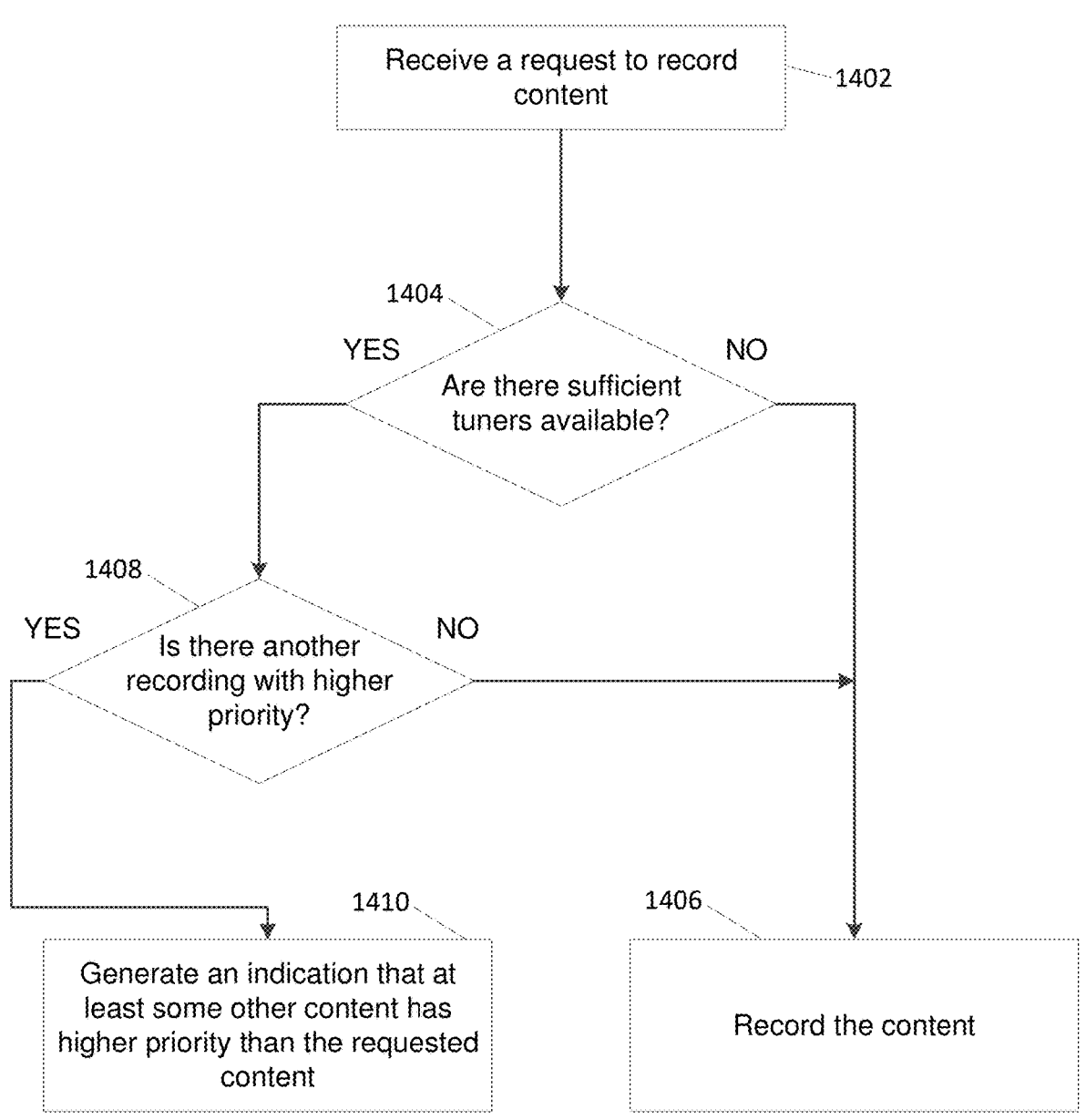
FIG. 14 illustrates a flow diagram of an illustrative method for determining priority for recording content.

FIG. 14 illustrates a flow diagram of an illustrative method for determining priority for recording content. In step 1402, a system may receive a request to record content. For example, a user may set a recording schedule for a series, set a recording for a single program, or the like. Alternatively or additionally, the system may determine that the user may be interested in a particular content, and may generate a request to record the particular content, accordingly.

In step 1404, the system may determine if there are sufficient tuners available for the DVR to record the requested content. For example, a DVR may include six tuners. If at a particular time, there are requests for five different pieces of content, the system may determine that there are sufficient tuners available. Alternatively, if at the particular time, there are requests for seven different pieces of content, the system may determine that there are not sufficient tuners available.

Alternatively or additionally, the system may make other determinations about whether there are sufficient resources available to record content. For example, the system may determine whether there is sufficient storage space, processing power, memory, bandwidth, or other resources available. The determination may be based on a short-term (e.g., an hour) or long-term (e.g., a month) view of resources. For example, if a user has 100 GB of data available per month on the user's data plan, and the requested recordings for the month will use 120 GB of data, the system may determine that there are insufficient resources available.

If there are sufficient tuners and other resources available, the system may go to step 1406, and record the content.

If there are not sufficient tuners and other resources available, the system may go to step 1408, and determine if there is another recording with higher priority. The system may analyze the requested recordings over a time period (e.g., an hour, a day, a week, a month, a year), and determine a priority for one or more of the recordings over the time period.

Based on the priority, the system may determine whether to record the content. If there is no other recording with higher priority, the system may go to step 1406, and record the content. If there are other recordings with higher priority, but the recording has sufficiently high priority for the system to perform the recording based on the tuners and other resources available, the system may go to step 1406, and record the content.

In some aspects, the system may determine priority based on a user who requested the recording. In some aspects, the system may determine priority based on a number of users interested in the content to be recorded. In some aspects, the system may determine priority based on a viewing history of one or more users. For example, the next episode in a regularly-viewed series may be a higher priority than a recording scheduled independent of a regularly-viewed series.

If other higher-priority content is being recorded or is scheduled to be recorded at the same time as the requested content, and there are not sufficient tuners or resources to also record the content, the system may go to step 1410, and generate an indication that at least some other content has higher priority than the requested content. The indication may include a name of the other higher-priority content, a reason that the other content is higher priority, an indication of who requested the other content, or other information about the other content. The system may offer the user an option to override or cancel the recording of the other content, to cancel the recording of different content than the requested content and the other higher-priority content, or take other action. The system may suggest another time that the content is available to be recorded, offer to record the content and the another time.

Figure 15:
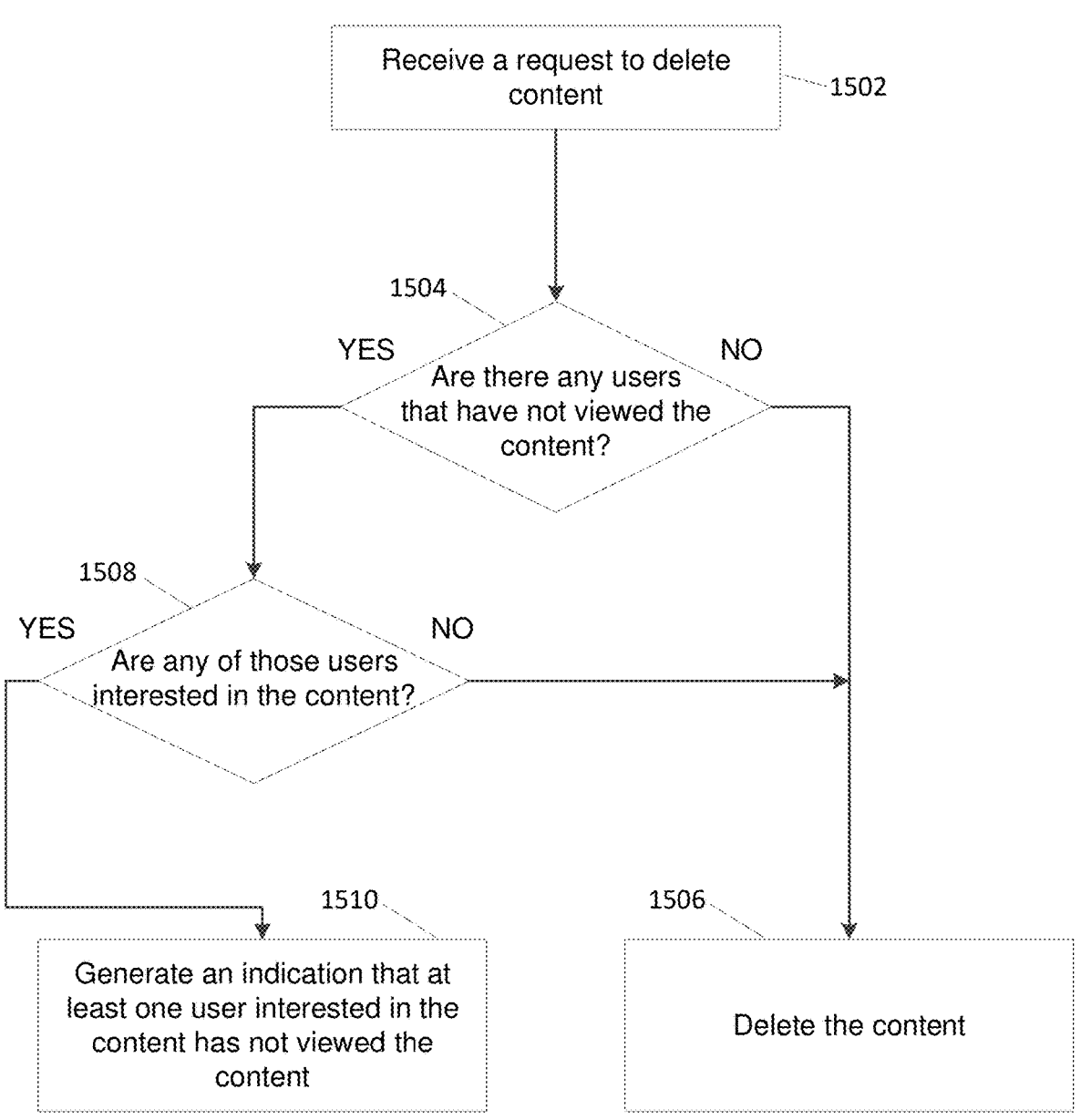
FIG. 15 illustrates a flow diagram of an illustrative method for determining whether to delete recorded content.

FIG. 15 illustrates a flow diagram of an illustrative method for determining whether to delete recorded content. In step 1502, the system may receive a request to delete content.

For example, the system may receive a request to delete content stored on a DVR, set-top box, smartphone, table, computer, or the like. The request may be received based on user input (e.g., the user selected the content for deletion), or the request may be received based on a system determination (e.g., the system may select content for auto-deletion).

In step 1504, the system may determine if there are any users that have not viewed the content. For example, the system may have four different users that regularly use the system to view content. If all four users have viewed the content, the system may determine that there are not any users that have not viewed the content.

If there are not any users that have not viewed the content, the system may go to step 1506, and delete the content.

In some embodiments, the system may make one or more additional determinations before deleting the content. For example, the system may determine whether the content has been marked for later viewing, to be saved, shared, etc. If the content has been marked for later viewing, to be saved, shared, etc., the system might not delete the content.

Returning to step 1504, if the system determines that there are some users that have not viewed the content, the system may go to step 1508, and determine if any of the users who have not viewed the content are interested in the content. For example, if a user has indicated that the user likes to watch shows about vampires, and the content to be deleted is a show about vampires, the system may determine that the user may be interested in the content. In another example, the system may determine whether one or more of the users who has not viewed the content has marked the content, or related content (e.g., a series of which the content is a part, another show with the same actors, another show by the same director, another show by the same producer, another show produced by the same company, another show with similar themes) as content that the user is interested in viewing.

If the system determines that there are not any users who have not viewed the content who are interested in the content (e.g., all the users who are interested in the content have viewed the content), then the system may go to step 1506, and delete the content.

If the system determines that there are one or more users who are interested in the content, then the system may go to step 1510. In step 1510, the system may generate an indication that at least one user interested in the content has not viewed the content. The indication may include additional information (e.g., the name or identifier of the user who has not viewed the content, information about the user's viewing history, suggestion for alternative content to delete, etc.). For example, if the content requested to be deleted is a particular episode of a series, the indication may include an identifier of the most recent episode that the interested user has viewed. Thus, in response to receiving a request to delete content, the system may provide an indication of whether another user is interested in viewing that content before the content is deleted. The indication may include an option to delete the content anyway, to save the content, to remind the user to view the content, to save the content elsewhere, or the like.

In some embodiments, the system may make a determination for whether to delete based on a determination of priority. The priority may be based on the content, the user interested in the content, or another factor. For example, if a parent is interested in content, then the system might not allow a child to delete that content. In another example, user interest may be ranked at different levels. For example, some content for a user may be "must watch," where other content may be "maybe interested to watch.

In some aspects, the system may delete content based on how often content is watched. For example, a DVR may be set to automatically delete content when the DVR is full. The DVR may determine what content to delete based on what content is most often viewed. For example, if a piece of recorded content has not been viewed in a year, the even if the content was previously marked as something that a particular user was interested in viewing, the DVR may determine that the content should be deleted. In another example, if a user regularly watches a first show for a period of time, then stops watching the first show in favor of one or more different shows, the DVR may determine that the user is no longer interested in the first show, and may delete one or more recordings of that show.

In some embodiments, a system implementing aspects described herein may include one or more additional features, described below.

One or more factors described herein, such as factors for determining priority settings, whether to record content, whether to delete content, how to determine if a user is interested in content, whether or how to show indicators, and the like, may be adjusted, ranked, or evaluated based on one or more user criteria, settings, or profiles, and/or one or more system, service-provider, or default criteria, settings, or profiles. In some aspects, some users might not be allowed to update settings. For example, a parent may have full privileges for inputting or adjusting settings, while a child may have restricted or no privileges for inputting or adjusting settings.

In some aspects, a user may opt not to have viewing of certain content tracked, not to show indicators for certain content, certain types of content, etc. For example, the system might not track viewing of adult content, of time-sensitive content (e.g., news programs), and the like. In another example, the system might not track viewing or display indicators for every user of the system. For example, the system may track viewing history and show indicators for parents, but not their children, or for people who live in a home, but not visitors.

In some aspects, the system may work with different systems or DVRs in different places. For example, the system may determine that a teenager regularly views a particular show, but that the teenager has not viewed any content for a long time. The teenager may have moved out of the home to attend a school, and may have a DVR at the teenager's school apartment. The teenager may be able to access the teenager's viewing history using the DVR at the teenager's school apartment. Programs previously on the DVR at the house may be deleted, and recorded on the DVR at the teenager's school apartment. When the teenager comes home for breaks or holidays, the teenager's favorite shows may be recorded on the home DVR, and the teenager's favorite shows may be deleted from the home DVR and recorded on the teenager's school apartment DVR when the teenager returns to school.

In some aspects, the system may automatically delete content that has been viewed by every user of the system that has interest in the content. The system may automatically delete content based on one or more factors (e.g., the content is a certain age, has been unviewed for a particular period of time, etc.). The system may use a viewing history of a user to determine whether to delete content. For example, if a user regularly views a series, but skips a particular episode and continues viewing the other episodes in the series, the system may determine that the user is not interested in watching that episode (e.g., possibly the user viewed that episode at a friend's house). The system may prompt the user to confirm whether the user has viewed the particular episode, whether the system should save or delete the particular episode, or the like.

In some aspects, the system may automatically delete content if the content is available to be viewed using another source. For example, a DVR that receives service from a service provider may be full, and therefore may be determining which content to delete. The DVR may determine that a user of the DVR has an account with a content-streaming service that offers particular content that is recorded on the DVR, that the service provider's video-on-demand service offers the particular content, or that the content is otherwise available to the user. The system may therefore suggest to delete or may automatically delete the content based on the content otherwise being available to be viewed by the user.

In some aspects, the system may generate a reminder for a user to view content. For example, if a couple enjoys watching a particular program together, the system may track the progress of each person of the couple in viewing the program. If a first person of the couple has watched the entire first season of a show, but a second person of the couple has only watched the first half of the first season of the show, the system may generate a reminder to the second person of the couple to catch up to the first person of the show. Alternatively or additionally, the system may generate a reminder to the second person of the couple to catch up to the first person of the couple so that the couple may continue to watch the show together.

In some aspects, the system may manage recordings based on what users have viewed content. For example, as discussed above, the system may determine whether a user is interested in viewing content based on one or more factors. The system may determine to record content based on the user potentially being interested in viewing the content.

In some aspects, the system may determine if every user has already viewed content, and might not record—or may prompt for whether to record—the content if every user of the system has already viewed the content. Alternatively or additionally, the system may determine if the content is available from one or more other sources before recording the content. For example, if content requested to be recorded is available via video on demand, from a content-streaming service that the user has a subscription to, or another source, the system might not record—or may prompt for whether to record—the content.

In some aspects, a web interface may be provided for managing recordings. A web interface may show information related to the aspects described herein (e.g., which users have viewed which content, which users are interested in which content, and the like).

In some aspects, the system may filter content based on what a user currently using the system has or has not seen. For example, if a user has seen every episode of a program, the program might not show up in the guide (or may show up in response to search, but not on a home or browse screen). In another example, the system may recommend or suggest to a user that the user watch content that the user is interested in viewing, but has not yet viewed. For example, if a user sits down in front of the television and turns it on, the television may display a prompt, "Welcome back. Do you want to watch the latest episode of your favorite show, which you have not seen, and which just aired last night?" The system may have automatically recorded the show, based on evaluating the user's viewing history to know that the show is the user's favorite. The user may respond affirmatively to the prompt and begin watching immediately. Alternatively, the user may provide input that the user has already seen the show (e.g., at a friend's house or using another device), that the user is not interested in watching that episode, that the user wants to watch the episode later, or some other input.

In some aspect, the system may filter content for other services based on the user's viewing history. For example, if the user is browsing the user's social-media page, a news page, etc., via the set-top box, the set-top box may filter posts about the latest episode of the user's favorite show, which the user has not watched yet, in order to avoid spoilers. In another example, the system may select advertising based on the user's viewing history. For example, if a user watched the most recent episode of a show already, the system may select for display an advertisement for the next upcoming episode. But if the user has not watched the most recent episode of the show, the system may select for display a different advertisement for the most recent episode of the show. In another example, if a user never watches or is not interested in a show, the system might not select to display advertisements for that show while the user is watching.

In some aspects, the system may predict or suggest content based on shows that a group of users currently using the system have seen. For example, the system may determine an identity of each user in a group of users currently viewing the system. The system may determine viewing interests and viewing histories for each user. The system may make a recommendation for content for the group to view based on the viewing interests and viewing histories of the users in the group. For example, if every user in the group enjoys watching a particular program, but not every user in the group has seen every episode of the program, the system may recommend that the group not watch the most recent episode.

Alternatively, the system may recommend that the group watch the episode after the most recent episode that the user who is the farthest behind has seen. Additionally, the system may filter a guide to show only shows that the group as a whole would enjoy. For example, if a first user enjoys romance, comedies, and dramas; a second user enjoys comedies and documentaries, and a third user enjoys comedies, dramas, and documentaries, the system may filter the shows on a guide to only show comedies, since comedies are the only genre enjoyed by every member of the group of users currently viewing the system. Alternatively, the guide may be filtered to show romance, comedies, dramas, and documentaries, since at least one user in the group enjoys each category. But the guide might not show historical films, since no current user is listed as enjoying historical films. A number of different combinations or factors may be used to filter a guide or make recommendations to a group of current users.

In some aspects, the system may provide social elements for interacting with the user's viewing history. For example, a user may compare viewing histories with friends, share the user's viewing history, and the like. The system may provide recommendations for shows that the user may like or might not like to watch, to purchase, and the like. The system may make recommendations based on viewing histories or preferences of other users that the user is friends or contacts with, other users of similar demographic as the user (e.g., income, education, age, race, location, etc.), or the like.

In some aspects, the system may display a visual representation of the user's viewing history. For example, the interface may include an option to view the user's viewing history on a timeline, sorted by genre, category, type of content, release date of content, or in some other manner.

In some aspects, the user's viewing history may be stored on a server. The server may receive updates to the user's viewing history from one or more sources (e.g., set-top box, DVR, tablet, smartphone, computer, smart television, movie theater, social media, etc.). One or more of the devices may synchronize the user's viewing history with the server, and thus the user may interact with content based on the user's viewing history regardless of the device that the user is interacting with the content.

In some aspects, the system may include an application programming interface for interacting with the user's viewing history. One or more services may interact with the application programming interface to receive the user's viewing history or information about the user's viewing history. For example, if a service provider maintains the viewing history, a service not provided by the service provider may receive, update, or otherwise interact with the user's viewing history.

The application programming interface may share information about content, including service tiers or packages through which content is available, dates that content is available (e.g., if the content is available via video-on-demand service for a certain range of dates), availability of content, and the like. A system may make recommendations, manage recordings, or allow a user to interact with content or perform other functions based on one or more pieces of information available through or from the application programming interface.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:

monitoring, by a computing device, content interaction activity of a plurality of users;

generating, based on the content interaction activity, content interaction activity data;

determining, using the content interaction activity data and for each of the plurality of users, a corresponding progress of playback through content;

causing display of a program guide that comprises:

a user-selectable indication of the content; and for at least one of the plurality of users, an indication of the corresponding progress of playback through the content;

receiving information indicating a selection of the user-selectable indication; and causing playback of the content beginning at a least progress of playback of the plurality of users, wherein the causing playback occurs based on the information.

2. The method of claim 1, wherein the indication of the corresponding progress of playback through the content comprises an indication of a percentage of the corresponding progress of playback through the content.

3. The method of claim 1, wherein the indication of the corresponding progress of playback through the content comprises an indication that a user of the plurality of users has completed playback of only a portion of the content.

4. The method of claim 1, wherein the monitoring the content interaction activity comprises:

monitoring data indicative of playback of the content by the plurality of users.

5. The method of claim 1, wherein the content comprises an episode of a series of episodes.

6. The method of claim 1, wherein the content comprises a series of episodes.

7. The method of claim 1, the indication of the corresponding progress of playback through the first-content item-is overlaid on the indication of the content.

8. The method of claim 1, wherein:

for the at least one of the plurality of users, the progress of playback through the content is a partial progress of playback through less than an entirety of the content, and the indication, of the corresponding progress of playback through the content, indicates that the partial progress of playback is through less than the entirety of the content.

9. The method of claim 1, further comprising:

determining that all of the plurality of users have completed playback through the content; and deleting a recording of the content, wherein the deleting is based on the determining that all of the plurality of users have completed playback through the content.

10. A computing device comprising:

one or more processors; and memory storing instructions that, when executed by the one or more processors, causes the computing device to:

monitor content interaction activity of a plurality of users;

generate, based on the content interaction activity, content interaction activity data;

determine, using the interaction activity data and for each of the plurality of users, a corresponding progress of playback through content;

cause display of a program guide that comprises:

a user-selectable indication of the content; and for at least one of the plurality of users, an indication of the corresponding progress of playback through the content;

receive information indicating a selection of the user-selectable indication; and cause playback of the content beginning at a least progress of playback of the plurality of users, wherein the playback is caused based on the information.

11. The computing device of claim 10, wherein the indication of the corresponding progress of playback through the content comprises an indication of a percentage of the corresponding progress of playback through the content.

12. The computing device of claim 10, wherein the indication of the corresponding progress of playback through the first-content comprises an indication that a user of the plurality of users has completed playback of only a portion of the content.

13. The computing device of claim 10, wherein the instructions, when executed by the one or more processors, cause the computing device to monitor the content interaction activity by:

monitoring data indicative of playback of the content by the plurality of users.

14. The computing device of claim 10, wherein the content comprises an episode of a series of episodes.

15. The computing device of claim 10, wherein the content comprises a series of episodes.

16. The computing device of claim 10, wherein for the indication of the corresponding progress of playback through the first-content is overlaid on the indication of the content.

17. The computing device of claim 10, wherein:

for the at least one of the plurality of users, the progress of playback through the content is a partial progress of playback through less than an entirety of the content, and the indication, of the corresponding progress of playback through the content, indicates that the partial progress of playback is through less than the entirety of the content.

18. The computing device of claim 10, wherein the instructions, when executed by the one or more processors, further cause the computing device to:

determine that all of the plurality of users have completed playback through the content; and delete a recording of the content, wherein the deleting is based on the determining that all of the plurality of users have completed playback through the content.

19. A non-transitory computer-readable medium storing instructions that, when executed, configure a computing device to:

monitor content interaction activity of a plurality of users;

generate, based on the content interaction activity, content interaction activity data;

determine, using the content interaction activity data and for each of the plurality of users, a corresponding progress of playback through content;

cause display of a program guide that comprises:

a user-selectable indication of the content; and for at least one of the plurality of users, an indication of the corresponding progress of playback through the content;

receive information indicating a selection of the user-selectable indication; and cause playback of the content beginning at a least progress of playback of the plurality of users, wherein the playback is caused based on the information.

20. The non-transitory computer-readable medium of claim 19, wherein the indication of the corresponding progress of playback through the content comprises an indication of a percentage of the corresponding progress of playback through the content.

21. The non-transitory computer-readable medium of claim 19, wherein the instructions, when executed, configure the computing device to monitor the content interaction activity by:

monitoring data indicative of playback of the content by the plurality of users.

22. The non-transitory computer-readable medium of claim 19, wherein:

for the at least one of the plurality of users, the progress of playback through the content is a partial progress of playback through less than an entirety of the content, and the indication, of the corresponding progress of playback through the content, indicates that the partial progress of playback is through less than the entirety of the content.

23. The non-transitory computer-readable medium of claim 19, wherein the instructions, when executed, further configure the computing device to:

determine that all of the plurality of users have completed playback through the content; and delete a recording of the content, wherein the deleting is based on the determining that all of the plurality of users have completed playback through the content.

\* \* \* \* \*